US011118252B2

(12) United States Patent
Sano et al.

(10) Patent No.: US 11,118,252 B2
(45) Date of Patent: Sep. 14, 2021

(54) GALVANNEALED STEEL SHEET

(71) Applicant: NIPPON STEEL CORPORATION, Tokyo (JP)

(72) Inventors: Kohichi Sano, Tokyo (JP); Hiroyuki Kawata, Tokyo (JP); Yuji Yamaguchi, Tokyo (JP); Satoshi Uchida, Tokyo (JP); Yoshinori Imai, Tokyo (JP); Riki Okamoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/043,283

(22) PCT Filed: Mar. 30, 2018

(86) PCT No.: PCT/JP2018/013678
§ 371 (c)(1),
(2) Date: Sep. 29, 2020

(87) PCT Pub. No.: WO2019/187027
PCT Pub. Date: Oct. 3, 2019

(65) Prior Publication Data
US 2021/0047716 A1 Feb. 18, 2021

(51) Int. Cl.
*C22C 38/60* (2006.01)
*C22C 38/58* (2006.01)
(Continued)

(52) U.S. Cl.
CPC .............. *C22C 38/60* (2013.01); *B32B 15/01* (2013.01); *B32B 15/013* (2013.01); *B32B 15/04* (2013.01); *B32B 15/043* (2013.01); *B32B 15/18* (2013.01); *C21D 1/76* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0257* (2013.01); *C21D 8/0263* (2013.01); *C21D 9/46* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/26* (2013.01); *C23C 2/28* (2013.01); *C23C 2/40* (2013.01);
(Continued)

(58) Field of Classification Search
CPC ......... C22C 38/60; C22C 38/00; C22C 38/54; C22C 38/50; C22C 38/46; C22C 38/42; C22C 38/001; C22C 38/002; C22C 38/005; C22C 38/008; C22C 38/02; C22C 38/04; C22C 38/06; C22C 38/08; C22C 38/12; C22C 38/14; C22C 38/16; C22C 38/44; C22C 38/48; C22C 38/58; C22C 38/18; C22C 38/20; C22C 38/22; C22C 38/24; C22C 38/26; C22C 38/28; C22C 38/32; C22C 38/34; C22C 38/38; C22C 38/40; C21D 1/76; C21D 6/002; C21D 6/008; C21D 8/0205; C21D 8/0226; C21D 8/0236; C21D 8/0257; C21D 2211/009; C21D 2211/001; C21D 2211/002; C21D 2211/005; C21D 2211/008; C21D 6/005; C21D 8/0263; C21D 9/46; C23C 28/02; C23C 28/021; C23C 28/023; C23C 28/025; C23C 2/06; C23C 2/28; C23C 2/40; C23C 2/02; C23C 2/26; C23C 30/00; C23C 30/005; Y02P 10/20; Y10T 428/12792; Y10T 428/12799; Y10T 428/12951; Y10T 428/12958; Y10T 428/12965; Y10T 428/12979; Y10T 428/26; Y10T 428/265; Y10T 428/264; Y10T 428/263; Y10T 428/2495; Y10T 428/24959; Y10T 428/24967
See application file for complete search history.

(56) References Cited

U.S. PATENT DOCUMENTS

2014/0227555 A1 8/2014 Kawata et al.
2015/0083278 A1 3/2015 Kawata et al.
2017/0313028 A1* 11/2017 Kawata .................. C22C 38/06

FOREIGN PATENT DOCUMENTS

JP 61-157625 A 7/1986
JP 2000-345288 A 12/2000
(Continued)

*Primary Examiner* — Michael E. La Villa
(74) *Attorney, Agent, or Firm* — Birch, Stewart, Kolasch & Birch, LLP

(57) ABSTRACT

A steel sheet includes a hot-dip galvanized layer or a galvannealed layer on a surface of the steel sheet, the steel sheet including: in mass %, C: 0.06% or more and 0.22% or less; Si: 0.50% or more and 2.00% or less; Mn: 1.50% or more and 2.80% or less; Al: 0.02% or more and 1.00% or less; P: 0.001% or more and 0.100% or less; S: 0.0005% or more and 0.0100% or less; N: 0.0005% or more and 0.0100% or less; and a balance: Fe and impurities.

8 Claims, No Drawings

(51) Int. Cl.
| | |
|---|---|
| *C22C 38/48* | (2006.01) |
| *C22C 38/44* | (2006.01) |
| *C22C 38/14* | (2006.01) |
| *C22C 38/12* | (2006.01) |
| *C22C 38/16* | (2006.01) |
| *C22C 38/06* | (2006.01) |
| *C22C 38/04* | (2006.01) |
| *C22C 38/02* | (2006.01) |
| *C22C 38/00* | (2006.01) |
| *C22C 38/08* | (2006.01) |
| *B32B 15/01* | (2006.01) |
| *C23C 2/28* | (2006.01) |
| *C23C 2/40* | (2006.01) |
| *C23C 2/06* | (2006.01) |
| *C21D 9/46* | (2006.01) |
| *C21D 8/02* | (2006.01) |
| *C21D 6/00* | (2006.01) |
| *C21D 1/76* | (2006.01) |
| *C22C 38/54* | (2006.01) |
| *C22C 38/50* | (2006.01) |
| *C22C 38/46* | (2006.01) |
| *C22C 38/42* | (2006.01) |
| *C22C 38/20* | (2006.01) |
| *C22C 38/24* | (2006.01) |
| *C22C 38/28* | (2006.01) |
| *C22C 38/38* | (2006.01) |
| *B32B 15/04* | (2006.01) |
| *C22C 38/22* | (2006.01) |
| *C22C 38/26* | (2006.01) |
| *C22C 38/18* | (2006.01) |
| *C22C 38/40* | (2006.01) |
| *C22C 38/34* | (2006.01) |
| *C22C 38/32* | (2006.01) |
| *B32B 15/18* | (2006.01) |
| *C23C 30/00* | (2006.01) |
| *C23C 28/02* | (2006.01) |
| *C23C 2/26* | (2006.01) |
| *C23C 2/02* | (2006.01) |

(52) U.S. Cl.
CPC ............ *C23C 28/02* (2013.01); *C23C 28/021* (2013.01); *C23C 28/023* (2013.01); *C23C 28/025* (2013.01); *C23C 30/00* (2013.01); *C23C 30/005* (2013.01); *C21D 2211/001* (2013.01); *C21D 2211/002* (2013.01); *C21D 2211/005* (2013.01); *C21D 2211/008* (2013.01); *C21D 2211/009* (2013.01); *Y02P 10/20* (2015.11); *Y10T 428/12792* (2015.01); *Y10T 428/12799* (2015.01); *Y10T 428/12951* (2015.01); *Y10T 428/12958* (2015.01); *Y10T 428/12965* (2015.01); *Y10T 428/12979* (2015.01); *Y10T 428/2495* (2015.01); *Y10T 428/24959* (2015.01); *Y10T 428/24967* (2015.01); *Y10T 428/26* (2015.01); *Y10T 428/263* (2015.01); *Y10T 428/264* (2015.01); *Y10T 428/265* (2015.01)

(56) References Cited

FOREIGN PATENT DOCUMENTS

| | | | |
|---|---|---|---|
| JP | 2007-63604 A | 3/2007 | |
| JP | 4730056 B2 | 7/2011 | |
| JP | 5305149 B2 | 10/2013 | |
| JP | 5370104 B2 | 12/2013 | |
| WO | WO 2013/047755 A1 | 4/2013 | |
| WO | WO-2016072477 A1 * | 5/2016 | ........... C21D 8/0273 |

* cited by examiner

GALVANNEALED STEEL SHEET

TECHNICAL FIELD

The present invention relates to a high-strength galvannealed steel sheet having a strength equal to or more than 590 MPa (preferably 980 MPa) suitable as an automobile steel sheet to be pressed, and excellent in extensibility, hole expandability, and fatigue property.

BACKGROUND ART

In recent years, due to increased awareness of environmental problems, the reduction in weight of a vehicle body is important to improve the fuel efficiency in the automotive industry. On the other hand, to secure the safety at a collision, a need to increase the strength of the vehicle body arises. It is only necessary to use a high-strength material in order to achieve both the reduced weight of the vehicle body and the improved safety, but as the strength is higher, the press forming is more difficult. Further, to improve the press performance, a steel sheet homogeneous in characteristics in the width direction is more preferable.

This is because generally as the strength of the steel material increases, the yield strength increases and the extensibility and the hole expandability decrease. Further, as the strength increases, the fatigue limit ratio decreases, resulting in difficulty in further increasing the strength.

In the high-strength hot-dip galvanized steel sheet, bainite is generated during slow cooling at the conventional annealing step. Therefore, for example, a steel sheet containing mainly martensite and including ferrite as disclosed in Patent Literature 1 is conventionally known, but a hot-dip galvanized steel sheet having sufficient formability has not been realized.

Patent Literature 2 discloses a technique of making the size of an austenite low-temperature transformation phase appropriate to improve the extensibility and the flangeability, but has not satisfied both the strength and the extensibility yet. Besides, regarding the improvement in extensibility, a steel sheet utilizing strain-induced transformation of the retained austenite (hereinafter, TRIP steel) and so on are disclosed in Patent Literatures 3, 4.

However, in an ordinary TRIP steel sheet, a large amount of Si is required to suppress the generation of cementite, but the addition of the large amount of Si degrades the hot-dip galvanization property on the surface of the steel sheet, leading to restriction of applicable steel materials. Further, in order to secure the high strength, a large amount of C is required, but the addition of the large amount of C causes a problem in terms of welding such as nugget cracks.

Regarding the hot-dip galvanization property on the surface of the steel sheet, a decrease of Si in the TRIP steel is disclosed in Patent Literature 5, and the improvements in hot-dip galvanization property and ductility are expected, but the problem in the aforementioned weldability still remains.

In a DP steel which can be produced with a smaller amount of C than that of the TRIP steel, when the Si amount is large, the ductility is higher as will be explained later. However, as in the case of the TRIP steel, the problem in platability still remains. As a method of solving the problem such as a decrease in platability due to the high Si, for example, Patent Literature 6 discloses that the atmosphere during annealing is controlled to decarburize the surface layer of the steel sheet. The decarburization of the surface layer of the steel sheet enables plating even if Si exceeds 1 mass %, but the surface layer of the steel sheet becomes soft, thereby causing a problem of a substantial deterioration in fatigue property. In addition, a steel sheet at an ultra-high tensile strength level of a strength of 980 MPa or more is high in strength of a microstructure and is therefore likely to be affected by cooling and a fluctuation in the width direction such as reduction in manufacturing, causing a problem in difficulty in producing a steel sheet having uniform characteristics in the width direction.

CITATION LIST

Patent Literature

Patent Literature 1: Japanese Patent No. 5305149
Patent Literature 2: Japanese Patent No. 4730056
Patent Literature 3: Japanese Laid-open Patent Publication No. 61-157625
Patent Literature 4: Japanese Laid-open Patent Publication No. 2007-063604
Patent Literature 5: Japanese Laid-open Patent Publication No. 2000-345288
Patent Literature 6: Japanese Patent No. 5370104
Patent Literature 7: International Publication Pamphlet No. WO 2013/047755

SUMMARY OF INVENTION

Technical Problem

In view of the current situation of the prior art, the present invention has a problem to increase the extensibility, the hole expandability, and the fatigue property in a galvannealed steel sheet having a strength equal to or more than 590 MPa (preferably 980 MPa) and uniformize the characteristics in a width direction of the steel sheet, and has an object to provide a galvannealed steel sheet solving the problem.

Solution to Problem

The present inventors earnestly researched the method for solving the above problem and have come to obtain the following knowledge.

(w) By performing cold rolling, then performing a heat treatment in a two-phase region or a single-phase region, and then cooling or holding at a temperature higher than a bainite generation temperature to suppress bainite transformation, a complex structure of ferrite and martensite with a low bainite fraction is formed to make it possible to improve the ductility.

(x) The addition of Si stably increases the ferrite fraction to improve the ductility, and the solid solution strengthening can improve the strength, thereby making it possible to secure an excellent strength-ductility balance.

(y) The decrease in platability due to the addition of Si is coped with the conventional atmosphere control, but martensite in the decarburized layer generated by the atmosphere control and impairing the fatigue property is made into a martensite grain having a low aspect ratio, thereby making it possible to increase the fatigue property. By applying a leveler to a hot-rolled steel sheet before and after the acid pickling of the hot-rolled steel sheet, the martensite in the decarburized layer can be made into the martensite grain having a low aspect ratio.

(z) By applying the leveler and controlling a heating rate in a desired temperature zone to a desired range at an annealing step after the cold rolling to suppress an uneven distribution of ferrite and homogenize a ferrite agglomerate in which ferrite grains aggregate to a harmful form, the hole expandability improves, thereby making it possible to achieve both the extensibility and the hole expandability and uniformize the characteristics in the width direction of the steel sheet including a plating state.

The present invention has been made based on the above knowledge, and its gist is as follows.

(1) A galvannealed steel sheet including a galvannealed layer on a surface of the steel sheet, the steel sheet having a component composition including: in mass %, C: 0.06% or more and 0.22% or less;
Si: 0.50% or more and 2.00% or less;
Mn: 1.50% or more and 2.80% or less;
Al: 0.01% or more and 1.00% or less;
P: 0.001% or more and 0.100% or less;
S: 0.0005% or more and 0.0100% or less;
N: 0.0005% or more and 0.0100% or less;
Ti: 0% or more and 0.10% or less;
Mo: 0% or more and 0.30% or less;
Nb: 0% or more and 0.050% or less;
Cr: 0% or more and 1.00% or less;
B: 0% or more and 0.0050% or less;
V: 0% or more and 0.300% or less;
Ni: 0% or more and 2.00% or less;
Cu: 0% or more and 2.00% or less;
W: 0% or more and 2.00% or less;
Ca: 0% or more and 0.0100% or less;
Ce: 0% or more and 0.0100% or less;
Mg: 0% or more and 0.0100% or less;
Zr: 0% or more and 0.0100% or less;
La: 0% or more and 0.0100% or less;
REM: 0% or more and 0.0100% or less;
Sn: 0% or more and 1.000% or less;
Sb: 0% or more and 0.200% or less; and
a balance: Fe and impurities, wherein:

a microstructure in a range of a ⅛ sheet thickness to a ⅜ sheet thickness centering on a ¼ sheet thickness in a sheet thickness direction from the surface of the steel sheet includes, in area ratio, ferrite: 15% or more and 85% or less, retained austenite: less than 5%, martensite: 15% or more and 75% or less, perlite: 5% or less, and a balance (including 0%): bainite;

the number of ferrite agglomerates each having a thickness in the sheet thickness direction of 20 μm or less is 50% or more of the total number of ferrite agglomerates;

a decarburized layer having a thickness of 10 μm or more and 150 μm or less is formed in a surface layer part of the steel sheet; and a grain size of ferrite in the decarburized layer is 30 μm or less, and a percentage of martensite grains each having an aspect ratio of 5 or more among martensite grains is 50% or less.

(2) The galvannealed steel sheet according to (1), further including a fine-grain layer having an average thickness of 0.1 μm to 5.0 μm between the galvannealed layer and the decarburized layer.

(3) The galvannealed steel sheet according to (1) or (2), wherein a difference in Fe concentration in a width direction in the galvannealed layer is less than 1.0% in mass %, and a difference in the percentage of martensite grains each having an aspect ratio of 5 or more in the width direction is 10% or less.

(4) The galvannealed steel sheet according to any one of (1) to (3), wherein the component composition includes one or two or more of: in mass %, Ti: 0.01% or more and 0.10% or less;
Mo: 0.01% or more and 0.30% or less;
Nb: 0.005% or more and 0.050% or less;
Cr: 0.01% or more and 1.00% or less;
B: 0.0002% or more and 0.0050% or less;
V: 0.001% or more and 0.300% or less;
Ni: 0.01% or more and 2.00% or less;
Cu: 0.01% or more and 2.00% or less;
W: 0.01% or more and 2.00% or less;
Ca: 0.0001% or more and 0.0100% or less;
Ce: 0.0001% or more and 0.0100% or less;
Mg: 0.0001% or more and 0.0100% or less;
Zr: 0.0001% or more and 0.0100% or less;
La: 0.0001% or more and 0.0100% or less;
REM: 0.0001% or more and 0.0100% or less;
Sn: 0.001% or more and 1.000% or less; and
Sb: 0.001% or more and 0.200% or less.

Advantageous Effects of Invention

According to the present invention, it is possible to provide a high-strength galvannealed steel sheet excellent in extensibility, hole expandability, and fatigue property, and uniformized in characteristics in a width direction of the steel sheet.

DESCRIPTION OF EMBODIMENTS

A galvannealed steel sheet in this embodiment is a galvannealed steel sheet includes a galvannealed layer on a surface of the steel sheet, the steel sheet having a component composition including: in mass %, C: 0.06% or more and 0.22% or less;
Si: 0.50% or more and 2.00% or less;
Mn: 1.50% or more and 2.80% or less;
Al: 0.01% or more and 1.00% or less;
P: 0.001% or more and 0.100% or less;
S: 0.0005% or more and 0.0100% or less;
N: 0.0005% or more and 0.0100% or less;
Ti: 0% or more and 0.10% or less;
Mo: 0% or more and 0.30% or less;
Nb: 0% or more and 0.050% or less;
Cr: 0% or more and 1.00% or less;
B: 0% or more and 0.0050% or less;
V: 0% or more and 0.300% or less;
Ni: 0% or more and 2.00% or less;
Cu: 0% or more and 2.00% or less;
W: 0% or more and 2.00% or less;
Ca: 0% or more and 0.0100% or less;
Ce: 0% or more and 0.0100% or less;
Mg: 0% or more and 0.0100% or less;
Zr: 0% or more and 0.0100% or less;
La: 0% or more and 0.0100% or less;
REM: 0% or more and 0.0100% or less;
Sn: 0% or more and 1.000% or less;
Sb: 0% or more and 0.200% or less; and
a balance: Fe and impurities, wherein:

a microstructure in a range of a ⅛ sheet thickness to a ⅜ sheet thickness centering on a ¼ sheet thickness in a sheet thickness direction from the surface of the steel sheet includes, in area ratio, ferrite: 15% or more and 85% or less, retained austenite: less than 5%, martensite: 15% or more and 75% or less, perlite: 5% or less, and a balance (including 0%): bainite;

the number of ferrite agglomerates each having a thickness in the sheet thickness direction of 20 μm or less is 50% or more of the total number of ferrite agglomerates;

a decarburized layer having a thickness of 10 μm or more and 150 μm or less is formed in a surface layer part of the steel sheet; and a grain size of ferrite in the decarburized layer is 30 μm or less, and a percentage of martensite grains each having an aspect ratio of 5 or more among martensite grains is 50% or less.

Hereinafter, a galvannealed steel sheet in this embodiment and a manufacturing method in this embodiment will be explained in order.

In the conventional DP (Dual Phase [two phase])-type ultra-high tensile strength steel (DP steel), it is usual to appropriately adjust structural fractions of ferrite, martensite and the like to thereby control the material of the steel. It has been found that when the ferrite fraction is increased, the ductility improves, but when ferrite is increased, a desired strength-ductility balance cannot be obtained because of (a) a decrease in strength due to the increase in the fraction of a soft structure and (b) a decrease in ductility due to agglomeration of ferrite grains.

The present inventors focused on characteristics and an existing form of ferrite and characteristics and existing forms of other structures, and made earnest researches in order to increase the extensibility, the hole expandability, and the fatigue property in the galvannealed steel sheet in this embodiment. As a result, it has been found that even if the strength is increased by hardening and form control of soft ferrite in the DP steel (including a case of containing a small amount of retained austenite), the ductility and the hole expandability do not decrease. This will be explained below.

It has been found that when the Si amount of the steel is set to 0.5% in order to decrease the degree of the decrease in strength in the above (a), the strength-ductility-hole expandability balance improves. The reason is not clear, but conceivable factors are that (a1) owing to the solid solution strengthening of ferrite, the martensite fraction was able to be accordingly decreased, and start points of cracks were decreased to improve the local ductility, (a2) owing to the solid solution strengthening of ferrite, the plastic unstable region decreased to improve the uniform extensibility, and the like.

However, on the other hand, due to the increase in the amount of Si, the scale on the surface layer increased to decrease the platability, resulting in difficulty in manufacturing the metal coated steel sheet. Hence, a method of controlling the atmosphere to form an oxide not on the surface layer of the steel sheet but inside the steel sheet to thereby secure excellent platability was used. However, in this method, decarburization proceeded on the surface layer of the steel sheet concurrently with the formation of the oxide inside the steel sheet, and therefore the surface layer of the steel sheet softened to make fatigue cracks easy to propagate and resulted in a great decrease in fatigue limit ratio.

The present inventors have found, in earnestly researching the method of solving the problem of the present invention, that the fatigue property is excellent in the steel sheet subjected to a leveler after hot rolling and the steel sheet subjected to polishing of the surface layer of the steel sheet. Further, it has been found that when bending is performed on the steel sheet at the annealing step, the fatigue property improves.

The reasons are not clear, but conceivable factors are that the aspect ratio of a martensite grain existing in the decarburized layer formed on the surface layer of the steel sheet decreased, and that the surface layer structure became fine to make the fatigue crack propagation hardly occur.

As explained above, owing to the addition of Si, the strength-ductility balance improved, but even with the increased ferrite fraction, the degree of improvement in the strength-ductility balance and the degree of improvement in the strength-hole expandability balance were low.

Generally, ferrite being a soft phase is large in deformation amount in a low strain region, as playing a role in bearing the deformation in the DP steel. However, ferrite existing near martensite is constrained by martensite during deformation and is thus small in deformation amount.

The present inventors focused on this phenomenon and investigated optimal conditions for constraining the deformation of ferrite. Then, the present inventors have arrived at the achievement of both of the extensibility and the hole expandability by making the deformation constraint state received from a hard phase (martensite) adjacent to ferrite appropriate while keeping the ferrite fraction providing the improvement in extensibility.

Heretofore, the main stream of microstructure control was investigation of the correlation between the crystal grain boundary and characteristics. It is obvious that a single-phase steel is greatly affected by the grain boundary different in characteristics, but the present inventors have conceived an idea that in the case of investigating the improvement in hole expandability in a complex structure in which structures greatly different in characteristics such as ferrite and martensite coexist, the crystal grain size in the individual structure is not significantly important but the existing form of the same phase greatly contributes to the characteristics.

Then, the present inventors have confirmed, on the basis of the above idea, that the importance of making an evaluation on an agglomerate of ferrite (an aggregate having a plurality of ferrite grains, the ferrite grains surrounded by the hard phase, and hereinafter sometimes referred to as a "ferrite agglomerate") adjacent to a hard phase (bainite, martensite), and have found optimal conditions for constraining the deformation of ferrite.

The mechanism of improving the quality of material under the appropriate conditions is not clear, but it is conceivable that if the thickness of the ferrite agglomerate in a sheet thickness direction is small, the deformation of ferrite is further constrained due to the deformation constraint by the hard phase, and ferrite hardens in a pseudo manner to significantly act on keeping the strength and to suppress the occurrence of cracks due to local huge deformation to thereby effectively act on the improvement in hole expandability.

The thickness of the ferrite agglomerate is set to a maximum value of the thickness in the direction vertical to the sheet surface in an individual ferrite agglomerate surrounded by the hard phase.

Besides, the extensibility depends on the deformability of ferrite and linearly correlates to the ferrite fraction, and therefore the control of the ferrite fraction and the existing form of ferrite enables achievement of both of the extensibility and the hole expandability.

The galvannealed steel sheet in this embodiment has been made based on the above knowledge found by the preset inventors, and feature requirements of the galvannealed steel sheet in this embodiment will be explained below.

First, the reason for limiting the component composition will be explained. Hereinafter, % relating to the component composition means mass %.

Component Composition

C: 0.06% or more and 0.22% or less

C is an element that increases the hardness of martensite and contributes to the improvement in strength. If C is less than 0.06%, the effect of addition cannot be sufficiently obtained, and therefore C is set to 0.06% or more and preferably 0.07% or more. On the other hand, if C exceeds 0.22%, the generation of cementite is promoted to decrease the hole expandability and the weldability, and therefore C is set to 0.22% or less and preferably 0.17% or less.

Si: 0.50% or more and 2.00% or less

Si is an element that contributes to the improvement in strength and fatigue strength without decreasing the ductility by solid solution strengthening. If Si is less than 0.50%, the effect of addition cannot be sufficiently obtained, and therefore Si is set to 0.50% or more, preferably 0.80% or more, and more preferably 1.00% or more. On the other hand, if Si exceeds 2.00%, the ductility and the spot weldability decrease, and therefore Si is set to 2.00% or less. Si is preferably 1.80% or less, and more preferably 1.60% or less.

Mn: 1.50% or more and 2.80% or less

Mn is an element that contributes to the improvement in strength by the solid solution strengthening and the improvement in hardenability. If Mn is less than 1.50%, the effect of addition cannot be sufficiently obtained, and therefore Mn is set to 1.50% or more and preferably 1.80% or more. On the other hand, if Mn exceeds 2.80%, the weldability decreases, the generation of ferrite is suppressed to decrease the ductility, and the segregation enlarges to decrease the hole expandability, and therefore Mn is set to 2.80% or less. Mn is preferably 2.50% or less.

Al: 0.01% or more and 1.00% or less

Al is an element that is required for deoxidation and is an element that suppresses the generation of a harmful carbide and contributes to the improvement in extensibility and hole expandability. In particular, Al is an element that contributes to the improvement in chemical conversion treatability without decreasing the ductility in a low-Si-based component system.

If Al is less than 0.01%, the effect of addition cannot be sufficiently obtained, and therefore Al is set to 0.01% or more. On the other hand, if Al exceeds 1.00%, the effect of addition is saturated and the chemical conversion treatability and the spot weldability decrease, and therefore Al is set to 1.00% or less. Al is preferably 0.80% or less in terms of improvement in chemical conversion treatment.

P: 0.001% or more and 0.100% or less

P is an element that contributes to the improvement in strength and is an element that increases the corrosion resistance in coexistence with Cu. If P is less than 0.001%, the effect of addition cannot be sufficiently obtained and the steelmaking cost greatly increases, and therefore P is set to 0.001% or more. In terms of the steelmaking cost, P is preferably 0.010% or more. On the other hand, if P exceeds 0.100%, the weldability and the workability decrease, and therefore P is set to 0.100% or less. When the corrosion resistance causes no problem and the workability is regarded as important, P is preferably 0.050% or less.

S: 0.0005% or more and 0.0100% or less

S is an element that forms a sulfide (MnS or the like) being a start point of a crack and impairs the hole expandability and the total elongation. Less S is better, but if S is decreased to less than 0.0005%, the steelmaking cost considerably increases, and therefore S is set to 0.0005% or more. On the other hand, if S exceeds 0.0100%, the hole expandability and the total elongation significantly decrease, and therefore S is set to 0.0100% or less. Si is preferably 0.0060% or less.

N: 0.0005% or more and 0.0100% or less

N is an element that impairs the workability. Further, N is an element that, when coexisting with Ti and/or Nb, forms a nitride (TiN and/or NbN) which impairs the extensibility and the hole expandability to reduce the effective amount of Ti and/or Nb.

Less N is better, but if N is decreased to less than 0.0005%, the steelmaking cost considerably increases, and therefore N is set to 0.0005% or more. On the other hand, if N exceeds 0.0100%, the workability, the extensibility, and the hole expandability significantly decrease, and therefore N is set to 0.0100% or less. N is preferably 0.0060% or less.

For the purpose of improvement in characteristics, the component composition of the metal coated steel sheet of the present invention may arbitrarily contain one or two or more of Ti: 0.01% or more and 0.10% or less, Mo: 0.01% or more and 0.30% or less, Nb: 0.005% or more and 0.050% or less, Cr: 0.01% or more and 1.00% or less, B: 0.0002% or more and 0.0050% or less, V: 0.001% or more and 0.300% or less, Ni: 0.01% or more and 2.00% or less, Cu: 0.01% or more and 2.00% or less, W: 0.01% or more and 2.00% or less, Ca: 0.0001% or more and 0.0100% or less, Ce: 0.0001% or more and 0.0100% or less, Mg: 0.0001% or more and 0.0100% or less, Zr: 0.0001% or more and 0.0100% or less, La: 0.0001% or more and 0.0100% or less, REM: 0.0001% or more and 0.0100% or less, Sn: 0.001% or more and 1.000% or less, and Sb: 0.001% or more and 0.200% or less.

Ti: 0.01% or more and 0.10% or less

Ti is an element that retards recrystallization to contribute to the formation of non-recrystallized ferrite and forms a carbide and/or a nitride to contribute to the improvement in strength.

If Ti is less than 0.01%, the containing effect cannot be sufficiently obtained, and therefore Ti is preferably 0.01% or more. On the other hand, if Ti exceeds 0.10%, the formability decreases, and therefore Ti is set to 0.10% or less. Ti is preferably 0.05% or less.

Mo: 0.01% or more and 0.30% or less

Mo is an element that retards recrystallization to contribute to the formation of non-recrystallized ferrite and increases the hardenability to contribute to the control of the martensite fraction. Further, Mo is an element that segregates on the grain boundary to suppress the intrusion of zinc into the structure of the welded portion in welding to thereby contribute to the prevention of cracks in welding and contribute to the suppression of the generation of perlite during cooling at the annealing step.

If Mo is less than 0.01%, the containing effect cannot be sufficiently obtained, and therefore Mo is preferably 0.01% or more. Mo is more preferably 0.04% or more. On the other hand, if Mo exceeds 0.30%, the formability deteriorates, and therefore Mo is set to 0.30% or less. Mo is preferably 0.25% or less.

Nb: 0.005% or more and 0.050% or less

Nb is an element that retards recrystallization to contribute to the formation of non-recrystallized ferrite and forms a carbide and/or a nitride to contribute to the improvement in strength. If Nb is less than 0.005%, the containing effect cannot be sufficiently obtained, and therefore Nb is preferably 0.005% or more. Nb is more preferably 0.010% or more. On the other hand, if Nb exceeds 0.050%, the formability decreases, and therefore Nb is set to 0.050% or less. Nb is preferably 0.030% or less.

Cr: 0.01% or more and 1.00% or less

Cr is an element that retards recrystallization to contribute to the formation of non-recrystallized ferrite and contribute to the suppression of the generation of perlite during cooling at the annealing step. If Cr is less than 0.01%, the containing effect cannot be sufficiently obtained, and therefore Cr is preferably 0.01% or more. Cr is more preferably 0.05% or more. On the other hand, if Cr exceeds 1.00%, the formability decreases, and therefore Cr is set to 1.00% or less. Cr is preferably 0.50% or less.

B: 0.0002% or more and 0.0050% or less

B is an element that retards recrystallization to contribute to the formation of non-recrystallized ferrite and increases the hardenability to contribute to the control of the martensite fraction. Further, B segregates on the grain boundary to suppress the intrusion of zinc into the structure of the welded portion in welding to thereby contribute to the prevention of cracks in welding and contribute to the suppression of the generation of perlite during cooling at the annealing step.

If B is less than 0.0002%, the containing effect cannot be sufficiently obtained, and therefore B is preferably 0.0002% or more. B is more preferably 0.0010% or more. On the other hand, if B exceeds 0.0050%, the formability decreases, and therefore B is set to 0.0050% or less. B is preferably 0.0025% or less.

V: 0.001% or more and 0.300% or less

V is an element that contributes to the improvement in strength by the precipitate strengthening, the fine grain strengthening by the suppression of growth of the ferrite crystal grain, and the dislocation strengthening through the suppression of the recrystallization. If V is less than 0.001%, the strength improving effect cannot be sufficiently obtained, and therefore V is preferably 0.001% or more. V is more preferably 0.010% or more. On the hand, if V exceeds 0.300%, a carbonitride excessively precipitates to decrease the formability, and therefore V is set to 0.300% or less. V is preferably 0.150% or less.

Ni: 0.01% or more and 2.00% or less

Ni is an element that suppresses the phase transformation at high temperature to contribute to the improvement in strength. If Ni is less than 0.01%, the containing effect cannot be sufficiently obtained, and therefore Ni is preferably 0.01% or more. Ni is more preferably 0.10% or more. On the other hand, if Ni exceeds 2.00%, the weldability decreases, and therefore Ni is set to 2.00% or less. Ni is preferably 1.20% or less.

Cu: 0.01% or more and 2.00% or less

Cu is an element that exists as fine grains to contribute to the improvement in strength. If Cu is less than 0.01%, the containing effect cannot be sufficiently obtained, and therefore Cu is preferably 0.01% or more. Cu is more preferably 0.10% or more. On the other hand, if Cu exceeds 2.00%, the weldability decreases, and therefore Cu is set to 2.00% or less. Cu is preferably 1.20% or less.

W: 0.01% or more and 2.00% or less

W is an element that suppresses the phase transformation at high temperature to contribute to the improvement in strength. If W is less than 0.01%, the containing effect cannot be sufficiently obtained, and therefore W is preferably 0.01% or more. W is more preferably 0.10% or more. On the other hand, if W exceeds 2.00%, the hot workability decreases to decrease the productivity, and therefore W is set to 2.00% or less. W is preferably 1.20% or less.

Ca: 0.0001% or more and 0.0100% or less
Ce: 0.0001% or more and 0.0100% or less
Mg: 0.0001% or more and 0.0100% or less
Zr: 0.0001% or more and 0.0100% or less
La: 0.0001% or more and 0.0100% or less
REM: 0.0001% or more and 0.0100% or less Ca, Ce, Mg, Zr, La, and REM are elements that contribute to the improvement in formability. If each of Ca, Ce, Mg, Zr, La, and REM is less than 0.0001%, the containing effect cannot be sufficiently obtained, and therefore any of the elements is preferably 0.0001% or more. Any of the elements is more preferably 0.0010% or more.

On the other hand, if each of Ca, Ce, Mg, Zr, La, and REM exceeds 0.0100%, the ductility may decrease, and therefore any of the elements is set to 0.0100% or less. Any of the elements is preferably 0.0070% or less.

Note that REM is an abbreviation for Rare Earth Metal and represents elements belonging to the lanthanoid series. REM or Ce is often contained in the form of mischmetal, and elements in the lanthanoid series may be contained other than La and Ce. Even if elements in the lanthanoid series other than La and Ce are contained as impurities, the characteristics are not impaired. Besides, metal La or Ce may be contained.

Sn: 0.001% or more and 1.000% or less

Sn is an element that suppresses the coarsening of the structure to contribute to the improvement in strength. If Sn is less than 0.001%, the containing effect cannot be sufficiently obtained, and therefore Sn is preferably 0.001% or more. Sn is more preferably 0.010% or more. On the other hand, if Sn exceeds 1.000%, the steel sheet excessively embrittles and the steel sheet may break in rolling, and therefore Sn is set to 1.000% or less. Sn is preferably 0.500% or less.

Sb: 0.001% or more and 0.200% or less

Sb is an element that suppresses the coarsening of the structure to contribute to the improvement in strength. If Sb is less than 0.001%, the containing effect cannot be sufficiently obtained, and therefore Sb is preferably 0.001% or more. Sb is more preferably 0.005% or more. On the other hand, if Sb exceeds 0.200%, the steel sheet excessively embrittles and the steel sheet may break in rolling, and therefore Sb is set to 0.200% or less. Sb is preferably 0.100% or less.

In the component composition of the galvannealed steel sheet in this embodiment, a balance except for the above elements are Fe and impurities. The impurities are elements inevitably mixed from the steel material and/or in the steelmaking process, which are elements whose presence is allowable within a range where the characteristics of the galvannealed steel sheet in this embodiment are not impaired.

For example, any of Ti, Mo, Nb, Cr, B, V, Ni, Cu, W, Ca, Ce, Mg, Zr, La, REM, Sn, and Sb is allowed as an inevitable impurity, if it is in a small amount less than the lower limit value defined in the component composition of the galvannealed steel sheet in this embodiment.

Besides, as impurities, H, Na, Cl, Sc, Co, Zn, Ga, Ge, As, Se, Y, Tc, Ru, Rh, Pd, Ag, Cd, In, Te, Cs, Ta, Re, Os, Ir, Pt, Au, and Pb are allowed within a range of 0.010% or less in total.

Next, the microstructure of the galvannealed steel sheet in this embodiment will be explained.

In the galvannealed steel sheet in this embodiment, the balance between the strength and each of the ductility, the hole expandability, and the fatigue property can be obtained at a high level by controlling the fractions and forms of ferrite and martensite and controlling the surface layer structure.

Generally, when the ferrite fraction is increased, the ductility improves, but the strength and the hole expandability decrease because ferrite is soft. In this embodiment, the hard phase constrains the deformation of the soft phase, thus making it possible to effectively utilize the characteristics and the function of ferrite.

The limited range of the microstructure: a ⅛ sheet thickness to a ⅜ sheet thickness centering on a ¼ sheet thickness in the sheet thickness direction from the surface of the steel sheet The microstructure at a ⅛ sheet thickness to a ⅜ sheet thickness centering on a ¼ sheet thickness in the sheet thickness direction from the surface of the steel sheet mainly bears the mechanical property of the whole steel sheet. Accordingly, in this embodiment, the range in the sheet thickness direction for defining the structural fraction is set to "a ⅛ sheet thickness to a ⅜ sheet thickness centering on a ¼ sheet thickness". Note that % of the structural fraction is an area ratio.

Ferrite: 15% or more and 85% or less

If ferrite is less than 15%, the securement of the desired extensibility becomes difficult, and therefore ferrite is set to 15% or more. Preferably, ferrite is 20% or more. On the other hand, if ferrite exceeds 85%, the securement of the desired strength becomes difficult, and therefore ferrite is set to 85% or less. Preferably, ferrite is 75% or less.

Perlite: 5% or less

If perlite exceeds 5%, the extensibility and the hole expandability decrease, and therefore perlite is set to 5% or less. The lower limit includes 0%.

Retained austenite: less than 5%

In terms of the securement of the extensibility, the supplementary utilization of retained austenite is effective, but the retained austenite causes the occurrence of hydrogen cracking depending on the use conditions, and therefore the retained austenite is set to less than 5%. The lower limit includes 0%.

Martensite: 15% or more and 75% or less

If martensite is less than 15%, the securement of the desired strength becomes difficult, and therefore martensite is set to 15% or more. Preferably, martensite is 20% or more. On the other hand, if martensite exceeds 75%, the securement of the desired extensibility becomes difficult, and therefore martensite is set to 75% or less. Preferably, martensite is 65% or less.

Bainite: balance

Bainite may be generated as a balance structure as a structure for adjusting the martensite fraction or may be 0%. Ferrite and martensite are secured at respective lower limit fractions, and therefore the balance is 70% as an upper limit.

Here, the calculation method of the area ratio will be explained.

A sample having a cross section in the sheet thickness parallel to the rolling direction as an observation surface is taken out, and the observation surface is polished, nital-etched, and observed under an optical microscope or a scanning electron microscopy (SEM). The area ratio is calculated using a captured image or image analysis software in the device. As for the area ratio, the image analysis is performed for each of different ten or more fields of view with one field of view in the image set to a length of 200 μm and a width of 200 μm or more, and the area ratios of the structures are calculated and an average value of them is found, and the average value is regarded as the area ratio.

The thickness of the ferrite agglomerate is measured using the above image. The thickness largest in the sheet thickness direction of the ferrite agglomerate in the above field of view is regarded as the thickness of the ferrite agglomerate.

The aspect ratio of a martensite grain in a later-explained decarburized layer can be calculated using the above image. A long portion and a short portion in the thickness of martensite are measured, and a value obtained by dividing the thickness of the long portion by the thickness of the short portion is regarded as the aspect ratio. Further, the number percentage of martensite grains each having an aspect ratio of 5 or more among martensite grains in the field of view having the area of the length of 200 μm and the width of 200 μm or more is calculated.

Note that if martensite is difficult to discriminate by nital etching, Le Pera etching can also be used.

Next, a method of measuring the retained austenite will be explained.

The area ratio of the retained austenite can be measured by an electron backscatter diffraction (EBSD) method or an X-ray diffraction method. In the case of measurement by the X-ray diffraction method, a diffraction intensity ($\alpha$ (111)) of a (111) plane of ferrite, a diffraction intensity ($\gamma$(200)) of a (200) plane of retained austenite, a diffraction intensity ($\alpha$(211)) of a (211) plane of ferrite, and a diffraction intensity ($\gamma$(311)) of a (311) plane of retained austenite are measured using a Mo—K$\alpha$ ray, and an area ratio ($f_A$) of retained austenite can be calculated by the following formula.

$$f_A = (\tfrac{2}{3})\{100/(0.7 \times \alpha(111)/\gamma(200)+1)\} + (\tfrac{1}{3})\{100/(0.78 \times \alpha(211)/\gamma(311)+1)\}$$

The thickness of the ferrite agglomerate in the sheet thickness direction: 20 μm or less The number of ferrite agglomerates each having a thickness of 20 μm or less: 50% or more of the total number of ferrite agglomerates In the galvannealed steel sheet in this embodiment, the thickness and the number of ferrite agglomerates are important for securing the desired hole expandability.

If the thickness in the sheet thickness direction of the ferrite agglomerate exceeds 20 μm, the constraint on the ferrite agglomerate by the adjacent hard phase (martensite, bainite) does not sufficiently act, the ferrite agglomerate is excessively deformed at its center portion and easily reaches the deformation limit to cause the local deformation in the steel sheet to fail to provide the effect of improving the hole expandability. Therefore, the thickness in the sheet thickness direction of the ferrite agglomerate is set to 20 μm or less and is preferably 16 μm or less.

If the number of ferrite agglomerates each having a thickness in the sheet thickness direction of 20 μm or less is less than 50% of the total number of ferrite agglomerates, the effect of improving the hole expandability is difficult to obtain at a significantly different level. Therefore, the number of ferrite agglomerates each having a thickness in the sheet thickness direction of 20 μm or less is set to 50% or more of the total number of ferrite agglomerates, and preferably 70% or more.

The thickness of the decarburized layer of the surface layer part of the steel sheet: 10 μm or more and 150 μm or less The decarburized layer is formed by C in the surface layer of the steel sheet reacting with oxygen in the atmosphere into CO or $CO_2$ and escaping into the atmosphere. The surface layer part reduced in C is less likely to obtain the hard structure, and thus becomes a softer structure than the steel sheet inside part.

The thickness of the decarburized layer is decided as follows.

The hardnesses are measured in a range of a ⅛ sheet thickness to a ⅜ sheet thickness centering on a ¼ sheet thickness in the sheet thickness, and an average values of them is regarded as a reference hardness of the steel sheet. The hardness is measured from a ⅛ sheet thickness of the steel sheet toward the surface layer of the steel sheet, and a point of 0.9 or less of the reference hardness is interporated, and the distance from the point of 0.9 or less to the surface layer of the steel sheet is regarded as the thickness of the decarburized layer.

In order to secure the desired hole expandability and fatigue property in the galvannealed steel sheet in this embodiment, the existence of the decarburized layer having a thickness in the surface layer part of the steel sheet: 10 μm or more and 150 μm or less is important. The formation of the decarburized layer will be explained later.

If the thickness of the decarburized layer is less than 10 μm, the platability and the hole expandability decrease. Therefore, the thickness of the decarburized layer is set to 10 μm or more, preferably 20 μm or more, and more preferably 30 μm or more. On the other hand, if the thickness of the decarburized layer exceeds 150 μm, the fatigue property does not improve even if the form of martensite in the decarburized layer is controlled, and the fatigue property and the strength decrease. Therefore, the thickness of the decarburized layer is set to 150 μm or less, preferably 120 μm or less, and more preferably 100 μm or less.

In the above decarburized layer, in terms of securing the desired fatigue property, the grain size of ferrite is set to 30 μm or less and the percentage of martensite grains each having an aspect ratio of 5 or more among martensite grains is set to 50% or less. This will be explained below.

The grain size of ferrite in the decarburized layer: 30 μm or less

If the grain size of ferrite in the decarburized layer exceeds 30 μm, the fatigue property decreases, and therefore the grain size of ferrite is set to 30 μm or less. The reason why the fatigue property decreases is not clear, but can be considered that if the grain size of ferrite is large, the fraction of the adjacent martensite becomes smaller and the fatigue crack more easily propagates. A smaller grain size of ferrite is more preferable, and the grain size is preferably 25 μm or less and more preferably 20 μm or less. Here, the grain size of ferrite represents an average grain size. For example, a region having an area of 40000 μm$^2$ or more is observed, and line segments parallel to the rolling direction are drawn, and an average value obtained by dividing the total of lengths of the line segments by the number of intersections of the line segments and the grain boundary is regarded as the ferrite grain size.

The percentage of martensite grains each having an aspect ratio of 5 or more: 50% or less In the martensite grain having an aspect ratio of 5 or more, the fatigue crack is considered to be likely to occur along martensite and easily propagate, and therefore the percentage of martensite grains each having an aspect ratio of 5 or more among martensite grains in the decarburized layer is decreased to further improve the fatigue property in the galvannealed steel sheet in this embodiment.

If the percentage of martensite grains each having an aspect ratio of 5 or more among martensite grains in the decarburized layer exceeds 50%, the fatigue property significantly decreases. Therefore, the percentage is set to 50% or less, preferably 40% or less, and more preferably 30% or less. Further, in order to uniformize the characteristics in the width direction, the difference in the percentage of martensite grains each having an aspect ratio of 5 or more in the width direction is preferably 10% or less and more preferably 6% or less.

Next, a fine-grain layer existing between the decarburized layer and the galvannealed layer will be explained. The fine-grain layer is a layer generated by oxidation and a decarburization reaction proceeding under conditions controlled to a specific atmosphere in annealing as explained later. Therefore, the structure constituting the fine-grain layer is substantially composed of a ferrite phase as a main component except oxides and inclusion particles. The boundary between the fine-grain layer and the decarburized layer is set to a boundary where the average grain size of ferrite in the fine-grain layer becomes less than ½ of the average grain size of ferrite in the decarburized layer.

The average thickness of the fine-grain layer is preferably set to 0.1 μm to 5.0 μm. If the average thickness of the fine-grain layer is less than 0.1 μm, the effect of suppressing the generation and extension of cracks cannot be obtained to fail to obtain the effect of improving the plating adhesiveness. If the average thickness is more than 5.0 μm, the alloying of the plating layer (Zn—Fe alloy generation) proceeds, and the content of Fe in the galvannealed layer increases to decrease the plating adhesiveness. The average thickness of the fine-grain layer is more preferably 0.2 μm to 4.0 μm, and furthermore preferably 0.3 μm to 3.0 μm.

The average thickness of the fine-grain layer is measured by the following method. A sample having a cross section parallel to the rolling direction of a base steel sheet as an observation surface is taken out from the galvannealed steel sheet. The observation surface of the sample is processed by a CP (Cross section polisher) apparatus, and a reflected electron image is observed under FE-SEM (Field Emission Scanning Electron Microscopy) at a magnification of 5000 times, and the measurement is performed.

The fine-grain layer contains an oxide of one or more of Si and Mn. Examples of the oxide include one or more selected from a group consisting of $SiO_2$, $Mn_2SiO_4$, $MnSiO_3$, $Fe_2SiO_4$, $FeSiO_3$, and $MnO$. The oxide is formed in the base steel sheet in a specific temperature zone in annealing as will be explained later. Since the growth of the ferrite phase crystal in the surface layer of the base steel sheet is suppressed by oxide particles, the fine-grain layer is formed.

Next, the galvannealed layer will be explained.

The galvannealed layer is a plating layer made by alloying, under normal galvannealing treatment conditions, a hot-dip galvanized layer (including a plating layer obtained by forming a zinc alloy by hot dipping) formed under normal plating conditions.

A plating deposition amount of the galvannealed layer is not particularly limited to a specific amount, but is preferably 5 g/m$^2$ or more as a single-side deposition amount in terms of securing the desired corrosion resistance.

Further, in order to decrease unevenness of the appearance, the difference in Fe concentration in the width direction in the galvannealed layer is preferably set to less than 0.1% in mass %, and more preferably 0.7% or less.

In the galvannealed steel sheet in this embodiment, for the purpose of improving the paintability and the weldability, an upper layer plating (for example, Ni plating) may be applied onto the galvannealed layer. Besides, for the purpose of improving the surface property of the galvannealed layer, various treatments such as a chromate treatment, a phosphating treatment, a lubrication improving treatment, a weldability improving treatment and so on may be performed.

The tensile strength of the galvannealed steel sheet in this embodiment is preferably 590 MPa or more. The high-strength steel sheet having a tensile strength of 590 MPa or more is suitable as a material steel sheet of a member for an automobile.

The sheet thickness of the galvannealed steel sheet in this embodiment is not particularly limited to a specific sheet thickness range but is preferably 0.1 to 11.0 mm. A high-strength thin steel sheet having a sheet thickness of 0.1 to 11.0 mm is suitable as a material steel sheet of a member for an automobile manufactured by presswork. Further, the high-strength thin steel sheet having the above sheet thickness can be easily manufactured on a thin sheet manufacturing line.

Next, the manufacturing method in this embodiment will be explained.

The manufacturing method of manufacturing the galvannealed steel sheet in this embodiment is characterized by, for example:

(a) heating a cast slab having a component composition of the galvannealed steel sheet in this embodiment to 1100° C. or higher and subjecting the cast slab to hot rolling, finishing the hot rolling at a finishing temperature of an Ar3 point or higher, and coiling a hot-rolled steel sheet after the finish of the hot rolling, in a temperature zone of 680° C. or lower;

(b) applying the leveler to the hot-rolled steel sheet before and/or after the acid pickling of the coiled hot-rolled steel sheet, and then subjecting the hot-rolled steel sheet to cold rolling at a rolling ratio of 30% or more and 70% or less into a cold-rolled steel sheet; and (c) performing the annealing on the cold-rolled steel sheet, by:

(c-1) controlling the atmosphere to include 1 to 10 volume % of $H_2$ and a balance of one or two or more of $N_2$, $H_2O$, and $O_2$, and have a ratio between a water partial pressure and a hydrogen partial pressure in a preheating zone and a soaking zone of −1.7 or more and −0.2 or less in $\log(P_{H2O}/P_{H2})$;

(c-2) heating the steel sheet up to a maximum attained temperature of 720° C. or higher and 900° C. or lower at an average heating rate of 1° C./sec or higher in a temperature zone of 500° C. or higher and a maximum attained temperature −50° C., and holding the steel sheet for 30 seconds or more and 30 minutes or less, and after holding the steel sheet;

(c-3) subjecting the steel sheet to bending of a bending radius of 800 mm or less one or more times while cooling the steel sheet from the maximum attained temperature −50° C. down to a cooling stop temperature T (° C.) satisfying following Formula (B) at an average cooling rate of equal to or higher than X (° C./sec) satisfying following Formula (A); and (d) performing hot-dip galvanization on the annealed steel sheet, and then performing the galvannealing treatment on the hot-dip galvanizing.

$$X \geq (Ar3-350)/10^a \quad (A)$$

$$a=0.6[C]+1.4[Mn]+1.3[Cr]+3.7[Mo]-100[B]-0.87$$

$$T \geq 730-350[C]-90[Mn]-70[Cr]-83[Mo] \quad (B)$$

[element]: mass % of element

Hereinafter, step conditions of the manufacturing method in this embodiment will be explained.

(a) Step

Heating temperature of the cast slab: 1100° C. or higher
Finishing hot rolling temperature: Ar3 point or higher
Coiling temperature: 680° C. or lower A cast slab having the component composition of the galvannealed steel sheet in this embodiment is prepared according to the common procedure. In the case where the cast slab is cooled once, the cast slab is heated to 1100° C. or higher and then subjected to the hot rolling. If the heating temperature of the cast slab is lower than 1100° C., the homogenization of the cast slab and the melting of the carbonitride are insufficient to lead to a decrease in strength and a deterioration in workability. Therefore, the heating temperature of the cast slab is set to 1100° C. or higher, and preferably 1150° C. or higher.

On the other hand, if the heating temperature of the cast slab exceeds 1300° C., the manufacturing cost increases, the productivity decreases, and the initial austenite locally increases in grain size to form a duplex grain structure, thus possibly decreasing the ductility. Accordingly, the heating temperature of the cast slab is preferably 1300° C. or lower, and more preferably 1250° C. or lower.

The cast slab may be subjected to directly to the hot rolling, as it is at high temperature (1100° C. or higher, and preferably 1300° C. or lower) immediately after the cast slab is cast.

The hot rolling is finished at a temperature of the Ar3 point or higher. If the finishing hot rolling temperature is lower than the Ar3 point, cracks may occur in the steel sheet in the subsequent cold rolling to decrease the quality of material. Therefore, the finishing hot rolling temperature is set to the Ar3 point or higher, and preferably (Ar3+15°) C or higher.

The finishing hot rolling temperature only needs to be appropriately set according to the component composition, quality of material and so on of the hot-rolled steel sheet in a temperature range of the Ar3 point or higher, and therefore the upper limit of the finishing hot rolling temperature is not particularly set.

Note that the Ar3 point only needs to be calculated by the following formula.

$$Ar3=901-325\times[C]+33\times[Si]+287\times[P]+40\times[Al]-92([Mn]+[Mo])$$

[element]: mass % of element

The hot-rolled steel sheet after the finish of the hot rolling is coiled at a temperature of 680° C. or lower. If the coiling temperature exceeds 680° C., cementite coarsens, the annealing time increases, and the grain size of ferrite in the decarburized layer in the surface layer exceeds 30 μm. Therefore, the coiling temperature is set to 680° C. or lower, preferably 630° C. or lower, and more preferably 580° C. or lower.

The lower limit of the coiling temperature is not particularly decided, but if it is lower than 400° C., the strength of the hot-rolled steel sheet excessively increases to increase the rolling load in the cold rolling, and therefore the coiling temperature is preferably 400° C. or higher.

(b) Step

Rolling ratio: 30% or more and 70% or less

After the hot-rolled steel sheet is subjected to the acid picking and the removal of a scale layer, the hot-rolled steel sheet is subjected to the cold rolling. If the rolling ratio is less than 30%, the formation of the recrystallization nucleus hardly occurs, a recovered grain coarsens to start grain growth, the recrystallization becomes insufficient to decrease the ductility, the number percentage of ferrite agglomerates each having a thickness in the sheet thickness direction of 20 μm or less decreases, and therefore the rolling ratio is set to 30% or more.

A higher rolling ratio is more preferable for decreasing the area ratio of the non-recrystallized ferrite to further improve the extensibility of the steel sheet, but the rolling load also increases with the increase in rolling ratio, and therefore the rolling ratio is set to 70% or less. If the rolling load is high, the accuracy of forming the steel sheet may decrease, and therefore the rolling ratio is preferably 65% or less.

Further, to improve the uniformity of the structure in the width direction, the leveler is applied to the hot-rolled steel sheet before and/or after the acid pickling of the hot-rolled steel sheet. This treatment can decrease the number percentage of martensite grains each having an aspect ratio of 5 or more in martensite grains in the decarburized layer.

By applying the leveler, the strain by the leveler remains, in addition to the strain by the cold rolling, even after the cold rolling. It is presumed that due to the strain accumulated in the surface layer of the steel sheet, ferrite is recovered and recrystallized during annealing, becomes closer to an equiaxial shape, then becomes austenite having a low aspect ratio by reverse transformation, and becomes martensite having a low aspect ratio by cooling, and its distribution becomes uniform in the width direction. Accordingly, in the case of not applying the leveler, the percentage of martensite grains each having an aspect ratio of 5 or more increases, and the difference in the percentage in the width direction increases (for example, the difference in the percentage of martensite grains each having an aspect ratio of 5 or more in the width direction becomes more than 10%), thereby increasing the difference in fatigue limit ratio to decrease the fatigue property.

Further, when the surface layer structure made uniform in the width direction as explained above is subjected to the plating treatment and the galvannealing treatment, the surface layer structure becomes more likely to be uniformly alloyed, resulting in a reduced difference in Fe concentration in the width direction in the galvannealed layer.

Further, by applying the leveler, the strain by the leveler is added in a range near the ¼ sheet thickness in the width direction, though not as high as in the surface layer, so that ferrite finely recrystallizes during temperature increase more than in the case of not applying the leveler. Then, during retention, austenite precipitates from the grain boundary of fine ferrite, and thereby the larger agglomerates of ferrite grains disperse. As a result, the number of ferrite agglomerates each having a thickness in the sheet thickness direction of 20 μm or less is 50% or more of the total number of ferrite agglomerates, and thereby can secure the desired hole expandability. Further, by applying the leveler, the rolling in the width direction becomes uniform in the subsequent cold rolling and the strain by the leveler remains uniformly in the width direction, and therefore the ferrite structure is also dispersed in the range near the ¼ sheet thickness in the width direction, thus improving the uniformity of the structure. It is considered that, for example, the amount of strain introduced into the surface layer of the steel sheet by a roll leveler, if 0.2% or more at maximum, can exert influence on the change of the structure of the surface layer.

(c) Step

The annealing step is the most important step for creating the microstructure of the galvannealed steel sheet in this embodiment. Hereinafter, each step condition will be explained.

(c-1) Annealing Atmosphere

Atmosphere composition: 1 to 10 volume % of $H_2$, and a balance of one or two or more of $N_2$, $H_2O$, and $O_2$ Ratio between a water partial pressure and a hydrogen partial pressure in a soaking zone: −1.7 or more and −0.2 or less in $\log(P_{H2O}/P_{H2})$ At the annealing step, the annealing atmosphere is composed of 1 to 10 volume % of $H_2$ and a balance of one or two or more of $N_2$, $H_2O$, and $O_2$, and the ratio between the water partial pressure and the hydrogen partial pressure in the soaking zone is controlled to −1.7 or more and −0.2 or less in $\log(P_{H2O}/P_{H2})$ When the steel sheet is annealed in the above annealing atmosphere, the scale on the surface layer of the steel sheet disappears and an oxide is generated inside the steel sheet. As a result, the platability of the steel sheet can be secured, and the hot-dip galvanized layer can be formed with excellent adhesiveness on the surface of the steel sheet at the later-explained plating step.

If $H_2$ is less than 1 volume %, it is difficult to make the $\log(P_{H2O}/P_{H2})$ into a range of −1.7 to −0.2 in the soaking zone, and the platability of the steel sheet deteriorates. Therefore, $H_2$ is set to 1 volume % or more, and preferably 3 volume % or more. If $H_2$ exceeds 10 volume %, the atmosphere cost increases. Therefore, $H_2$ is set to 10 volume % or less, and preferably 7 volume % or less.

If the $\log(P_{H2O}/P_{H2})$ in the soaking zone is less than −1.7, the thickness of the decarburized layer becomes less than 10 μm, and the platability decreases. Therefore, the $\log(P_{H2O}/P_{H2})$ in the soaking zone is set to −1.7 or more, preferably −1.3 or more, and more preferably −1 or more. If the $\log(P_{H2O}/P_{H2})$ in the soaking zone exceeds −0.2, the thickness of the decarburized layer exceeds 150 μm, and the fatigue property decreases. Therefore, the $\log(P_{H2O}/P_{H2})$ in the soaking zone is set to −0.2 or less, preferably −0.5 or less, and more preferably −0.7.

Note that if the thickness of the decarburized layer can be controlled, for example, the ratio between the partial pressure of dioxide and the partial pressure of monoxide may be controlled instead of the ratio between the water partial pressure and the hydrogen partial pressure.

The above condition of the annealing atmosphere is the condition in the soaking zone, and is controlled to −1.7 or more and −0.2 or less in $\log(P_{H2O}/P_{H2})$ also in the preheating zone. Adjustment of the ratio between the water vapor partial pressure $P_{H2O}$ and the hydrogen partial pressure $P_{H2}$ in the preheating zone exerts an influence on the thickness of the decarburized layer, the thickness of the fine-grain layer, the aspect ratio of the martensite grain, the uniformity in Fe concentration in the width direction, and the surface property of the steel sheet before plating.

As explained above, the strain by the leveler is added to the strain by the cold rolling in the width direction and remains also after the cold rolling as explained above. Further, adjustment of the ratio between the water vapor partial pressure $P_{H2O}$ and the hydrogen partial pressure $P_{H2}$ in the preheating zone suppresses the decrease in the C concentration of the surface layer and thereby suppresses excessive recrystallization, so that ferrite recrystallizing during temperature increase becomes fine. As a result, in the surface layer, austenite finely precipitates during subsequent annealing in the soaking zone, the aspect ratio of a martensite grain generated after the cooling decreases, and ferrite becomes fine. By applying the leveler as in the above manner and controlling the ratio to −1.7 or more and −0.2 or less in $\log(P_{H2O}/P_{H2})$ in the preheating zone, the aspect ratio of the martensite grain in the decarburized layer is improved.

Further, by controlling the ratio to −1.7 or more and −0.2 or less in $\log(P_{H2O}/P_{H2})$ in the preheating zone, excessive decarbonization on the surface of the steel sheet is suppressed and excessive Fe—Zn alloying reaction on the grain boundary on the surface of the steel sheet is suppressed at the subsequent plating step and alloying step. This promotes the formation of the uniform Fe—Al alloy layer in the galvannealed layer to make the Fe concentration uniform in the width direction, thereby making it possible to obtain excellent plating adhesiveness and uniformity in appearance.

If the $\log(P_{H2O}/P_{H2})$ exceeds −0.2 in the preheating zone, the decarbonization on the surface of the steel sheet becomes excessive, the thickness of the decarburized layer exceeds 150 μm, and the fatigue property decreases. Accordingly, the $\log(P_{H2O}/P_{H2})$ in the preheating zone is set to −0.2 or less, preferably −0.5 or less, and more preferably −0.7. On the other hand, if the $\log(P_{H2O}/P_{H2})$ is less than −1.7 in the preheating zone, a portion with a high carbon concentration is generated on the surface of the steel sheet, and the fine-grain layer is not formed on the surface, so that the Fe concentration in the width direction becomes more likely to be non-uniform and the plating adhesiveness further decreases. Accordingly, the $\log(P_{H2O}/P_{H2})$ in the preheating zone is set to −1.7 or more, preferably −1.3 or more, and more preferably −1 or more.

(c-2) Heating and Holding

Average heating rate in the temperature zone of 500° C. or higher and the maximum attained temperature −50° C.: 1° C./sec or higher Maximum attained temperature: 720° C. or higher and 900° C. or lower Holding at the maximum attained temperature: 30 seconds or more and 30 minutes or less At the annealing step, the average heating rate in the temperature zone of 500° C. or higher and the maximum attained temperature −50° C. is important in terms of forming ferrite in the desired form.

When the steel sheet is gradually heated, ferrite starts to be generated at 500° C. and higher. Therefore, the lower limit of the temperature zone defining the average heating rate is set to 500° C. Finally, the steel sheet is heated up to the maximum attained temperature of 720° C. or higher and 900° C. or lower and held for 30 seconds or more and 30 minutes or less, and the temperature zone for heating at an average heating rate of 1° C./sec or higher is set to the maximum attained temperature −50° C.

In terms of controlling the form of ferrite, a higher average heating rate in the above temperature zone is better. If the average heating rate is less than 1° C./sec, the nucleation starts from a preferential nucleus generation position, the ferrite agglomerate becomes larger, the number percentage of ferrite agglomerates each having a thickness in the sheet thickness direction of 20 μm or more exceeds 50%, and the hole expandability decreases. Therefore, the average heating rate in the above temperature zone is set to 1° C./sec or higher, and preferably 5° C./sec or higher.

When the steel sheet contains Ti, Nb, V and the like which form carbides, the steel sheet is retained in a temperature zone of 550 to 760° C. for 30 seconds in heating the steel sheet, then heated up to the maximum attained temperature −50° C., and subjected to annealing at a maximum attained temperature of 720 to 900° C., thereby enabling the carbides such as TiC, NbC, VC to finely precipitate in the steel sheet structure.

The maximum attained temperature at the annealing step is set to 720° C. or higher and 900° C. or lower. If the maximum attained temperature is lower than 720° C., austenite cannot be sufficiently formed, martensite cannot be sufficiently secured, and cementite remains undissolved to decrease the tensile strength (TS) and the hole expandability (λ). Therefore, the maximum attained temperature is set to 720° C. or higher. In terms of sufficiently forming austenite and sufficiently melting cementite to secure the desired tensile strength (TS) and hole expandability (λ), the maximum attained temperature is preferably 770° C. or higher.

If the maximum attained temperature exceeds 900° C., the austenite grain coarsens and the subsequent formation of ferrite delays to deteriorate the ductility. Therefore, the maximum attained temperature is set to 900° C. or lower. In terms of securing the desired ductility to further increase the strength-ductility balance, the maximum attained temperature is preferably 850° C. or lower.

The holding time at the maximum attained temperature is set to 30 seconds or more and 30 minutes or less. If the holding time is less than 30 seconds, austenite cannot be sufficiently formed, martensite cannot be sufficiently secured, and cementite remains undissolved. The decrease of martensite decreases the tensile strength (TS), and the ductility and the hole expandability (A) do not increase though the strength decreases due to the existence of the cementite remaining undissolved, so that TS×λ decreases. The holding time is set to 30 seconds or more, and preferably 60 seconds or more.

If the holding time exceeds 30 minutes, the austenite grain coarsens, and the thickness of the ferrite agglomerate increases to be larger than the defined range, so that the hole expandability decreases and the value of strength×λ decreases. Accordingly, the holding time is set to 30 minutes or less, and preferably 20 minutes or less.

Note that the holding time is the time of holding in the temperature zone of the maximum attained temperature to the maximum attained temperature −50° C.

(c-3) Cooling and Bending

Cooling temperature zone: the maximum attained temperature −50° C. to the cooling stop temperature T (° C.) satisfying following Formula (B)

Average cooling rate: equal to or higher than X (° C./sec) satisfying following Formula (A)

Bending of a radius of 800 mm or less during cooling: one or more times

Subsequent to the above holding, bending of a bending radius of 800 mm or less is performed on the steel sheet one or more times while cooling the steel sheet from the maximum attained temperature −50° C. down to the cooling stop temperature T (° C.) satisfying following Formula (B) at the average cooling rate of equal to or higher than X (° C./sec) satisfying following Formula (A).

Following Formula (A) is an empirical formula defining the average cooling rate (° C./sec) capable of suppressing the generation of perlite, in association with the component composition. Following Formula (B) is an empirical formula defining the lower limit of the temperature zone capable of suppressing the generation of bainite and securing a sufficient amount of martensite, in association with the component composition.

If the cooling stop temperature T (° C.) does not satisfy following Formula (B), a large amount of bainite is generated, a sufficient amount of martensite cannot be obtained, and the desired strength cannot be secured. Therefore, the cooling stop temperature T (° C.) is set to a temperature satisfying following Formula (B).

If the average cooling rate down to the cooling stop temperature T (° C.) is low, perlite which impairs the extensibility and the hole expandability is generated during cooling. Therefore, in order to suppress the fraction of perlite to 5% or less, the average cooling rate X (° C./sec) down to the cooling stop temperature T (° C.) is set to the average cooling rate satisfying following Formula (A).

$$X \geq (Ar3-350)/10^a \quad (A)$$

$$a = 0.6[C]+1.4[Mn]+1.3[Cr]+3.7[Mo]-100[B]-0.87$$

$$T \geq 730-350[C]-90[Mn]-70[Cr]-83[Mo] \quad (B)$$

[element]: mass % of element

During cooling of the steel sheet, bending of a bending radius of 800 mm or less is performed on the steel sheet one or more times. This bending can make the grain size in the surface layer of the steel sheet fine, and set the grain size of ferrite in the decarburized layer to 30 µm or less. This reason is not clear, but is considered that the nucleation of crystal grains different in crystal orientation is promoted to decrease the crystal grain size in the surface layer of the steel sheet obtained after the annealing.

If the bending radius exceeds 800 mm, the amount of strain introduced into the surface layer of the steel sheet is low, the nucleation of crystal grains does not occur, and the crystal grain fining effect cannot be obtained. Therefore, the bending radius is set to 800 mm or less. As the bending amount (working amount) is larger, the nucleation is further promoted, and the crystal grain fining effect is further obtained. Therefore, the bending radius is preferably 730 mm or less, and more preferably 650 mm or less.

Since the bending radius only needs to be appropriately set based on the sheet thickness of the steel sheet and the load specifications of the facility, the lower limit of the bending radius is not particularly set.

(d) Step

Hot-Dip Galvanization

Plating bath temperature: 440 to 480° C.

Steel sheet temperature: 430 to 490° C.

The steel sheet after the finish of the annealing step is immersed in a plating bath, and thereby the surface of the steel sheet is subjected to hot-dip galvanization including hot dipping of a zinc alloy.

The plating bath is a plating bath mainly containing molten zinc and may contain one or two or more of Al, Pb, Sb, Si, Sn, Mg, Mn, Ni, Cr, Co, Ca, Cu, Li, Ti, Be, Bi, Sc, I, Cs, and REM. The Al amount only needs to be appropriately adjusted depending on the easiness of alloying.

The plating bath temperature is preferably 440 to 480° C. If the plating bath temperature is lower than 440° C., the viscosity of the plating bath excessively increases to make it difficult to appropriately control the thickness of the plating layer, and the appearance and the plating adhesiveness of the steel sheet deteriorate. Therefore, the plating bath temperature is preferably 440° C. or higher, and more preferably 450° C. or higher.

On the other hand, if the plating bath temperature exceeds 480° C., a large amount of fume is generated to deteriorate the work environment and hinder the safe operation. Therefore, the plating bath temperature is preferably 480° C. or lower, and more preferably 470° C. or lower.

If the temperature of the steel sheet immersed in the plating bath is lower than 430° C., it becomes difficult to stably maintain the plating bath temperature at 450° C. or higher. Therefore, the temperature of the steel sheet immersed in the plating bath is preferably 430° C. or higher, and more preferably 450° C. or higher.

On the other hand, if the temperature of the steel sheet immersed in the plating bath exceeds 490° C., it becomes difficult to stably maintain the plating bath temperature at 470° C. or lower. Therefore, the temperature of the steel sheet immersed in the plating bath is preferably 490° C. or lower, and more preferably 470° C. or lower.

After the plating, cold rolling of a reduction ratio of 3% or less may be performed on the hot-dip galvanized steel sheet cooled down to room temperature. This cold rolling can correct the shape of the hot-dip galvanized steel sheet, and can adjust the proof stress and the ductility of the steel sheet. Note that if the reduction ratio exceeds 3%, the ductility deteriorates. Therefore, the reduction ratio is preferably 3% or less.

Alloying of the Hot-Dip Galvanizing

Heating temperature: 470 to 620° C.

Heating time: 2 to 200 seconds

A galvannealing treatment is performed on the hot-dip galvanized layer formed by immersing the steel sheet in the plating bath, to form a galvannealed layer on the surface of the steel sheet.

If the galvannealing treatment temperature is lower than 470° C., the alloying does not sufficiently proceed. Therefore, the galvannealing treatment temperature is preferably 470° C. or higher, and more preferably 490° C. or higher. On the other hand, if the galvannealing treatment temperature exceeds 620° C., coarse cementite is generated and perlite is generated to decrease the strength. Therefore, the galvannealing treatment temperature is preferably 620° C. or lower, and more preferably 600° C. or lower.

If the galvannealing treatment time is less than 2 seconds, the alloying of the hot-dip galvanized layer does not sufficiently proceed. Therefore, the galvannealing treatment time is preferably 2 seconds or more, and more preferably 5 seconds or more. On the other hand, if the galvannealing treatment time exceeds 200 seconds, perlite is generated and the plating layer is overalloyed. Therefore, the galvannealing treatment time is preferably 200 seconds or less, and more preferably 150 seconds or less.

Note that the galvannealing treatment may be performed immediately after the steel sheet is pulled up from the plating bath, or may be performed after the metal coated steel sheet is once cooled down to room temperature and reheated.

After the galvannealing treatment, the cold rolling of a reduction ratio of 3% or less may be performed on the galvannealed steel sheet cooled down to room temperature. This cold rolling can correct the shape of the galvannealed steel sheet, and can adjust the proof stress and the ductility of the steel sheet. Note that if the reduction ratio exceeds 3%, the ductility deteriorates. Therefore, the reduction ratio is preferably 3% or less.

EXAMPLE

Next, examples of the present invention will be explained, and conditions in the examples are condition examples employed for confirming the feasibility and the effect of the present invention, and the present invention is not limited to the condition examples. The present invention may employ various conditions as long as achieving the object of the present invention without departing from the scope of the present invention.

Example 1

The molten steel having the component composition listed in Table 1 was subjected to continuous casting according to the common procedure into a cast slab. In Table 1, the component compositions of Codes A to T satisfy the component composition of the present invention.

The component composition of Code a does not satisfy the component composition of the present invention regarding C and Mo, the component composition of Code b does not satisfy the component composition of the present invention regarding Mn and P, the component composition of Code c does not satisfy the component composition of the present invention regarding Al and Nb, and the component composition of Code d does not satisfy the component composition of the present invention regarding C and Mn.

The component composition of Code e does not satisfy the component composition of the present invention regarding Si and S, the component composition of Code f does not satisfy the component composition of the present invention regarding N and Ti, the component composition of Code g does not satisfy the component composition of the present invention regarding Si, N and Ti, the component composition of Code h does not satisfy the component composition of the present invention regarding Cr, and the component composition of Code i does not satisfy the component composition of the present invention regarding B.

TABLE 1

|   | C | Si | Mn | P | S | N | Al | Nb | Ti | Mo |
|---|---|---|---|---|---|---|---|---|---|---|
| A | 0.100 | 1.00 | 2.70 | 0.008 | 0.0020 | 0.0030 | 0.030 | | | |
| B | 0.120 | 1.70 | 2.20 | 0.010 | 0.0030 | 0.0030 | 0.040 | | | |
| C | 0.140 | 1.60 | 2.20 | 0.008 | 0.0035 | 0.0040 | 0.040 | | | |
| D | 0.130 | 0.53 | 2.40 | 0.009 | 0.0020 | 0.0040 | 0.040 | 0.03 | 0.02 | |
| E | 0.070 | 0.83 | 2.60 | 0.009 | 0.0020 | 0.0040 | 0.040 | 0.03 | 0.03 | |
| F | 0.095 | 1.51 | 2.01 | 0.009 | 0.0020 | 0.0040 | 0.040 | 0.02 | 0.02 | 0.050 |
| G | 0.100 | 1.95 | 2.20 | 0.008 | 0.0010 | 0.0024 | 0.036 | | 0.02 | 0.050 |
| H | 0.150 | 1.10 | 1.70 | 0.011 | 0.0020 | 0.0028 | 0.800 | | | 0.100 |
| I | 0.140 | 1.20 | 2.00 | 0.010 | 0.0010 | 0.0020 | 0.032 | | 0.02 | |
| J | 0.210 | 0.90 | 2.60 | 0.010 | 0.0020 | 0.0040 | 0.030 | 0.05 | | 0.050 |
| K | 0.080 | 1.35 | 2.00 | 0.080 | 0.0080 | 0.0050 | 0.040 | | | |
| L | 0.100 | 1.20 | 2.00 | 0.008 | 0.0090 | 0.0090 | 0.050 | 0.01 | 0.08 | |
| M | 0.108 | 1.53 | 2.12 | 0.005 | 0.0026 | 0.0026 | 0.033 | | | |
| N | 0.096 | 1.46 | 2.45 | 0.010 | 0.0033 | 0.0031 | 0.022 | | | |
| O | 0.113 | 1.30 | 2.03 | 0.006 | 0.0035 | 0.0034 | 0.032 | | | |
| P | 0.102 | 1.64 | 2.21 | 0.010 | 0.0031 | 0.0029 | 0.023 | | | |
| Q | 0.119 | 1.59 | 2.54 | 0.009 | 0.0022 | 0.0033 | 0.024 | | | |
| R | 0.090 | 1.52 | 2.28 | 0.009 | 0.0027 | 0.0029 | 0.026 | | | |
| S | 0.106 | 1.27 | 2.13 | 0.006 | 0.0025 | 0.0029 | 0.025 | | | |
| T | 0.104 | 1.62 | 2.03 | 0.009 | 0.0034 | 0.0026 | 0.021 | | | |
| a | 0.250 | 1.20 | 2.00 | 0.010 | 0.0030 | 0.0030 | 0.030 | | | 0.350 |
| b | 0.140 | 1.30 | 3.10 | 0.120 | 0.0030 | 0.0030 | 0.030 | | | |
| c | 0.090 | 1.50 | 2.20 | 0.010 | 0.0030 | 0.0030 | 1.200 | 0.08 | | 0.050 |
| d | 0.042 | 1.20 | 1.20 | 0.010 | 0.0030 | 0.0030 | 0.030 | | 0.02 | 0.050 |
| e | 0.130 | 2.50 | 1.80 | 0.010 | 0.0120 | 0.0030 | 0.030 | | 0.02 | |
| f | 0.140 | 1.10 | 1.80 | 0.010 | 0.0030 | 0.0120 | 0.030 | | 0.12 | |
| g | 0.140 | 0.20 | 1.80 | 0.010 | 0.0030 | 0.0120 | 0.030 | | 0.12 | |
| h | 0.101 | 1.51 | 2.50 | 0.009 | 0.0020 | 0.0040 | 0.040 | 0.02 | 0.02 | 0.050 |
| i | 0.080 | 1.35 | 2.00 | 0.080 | 0.0050 | 0.0050 | 0.040 | | | |

|   | Cr | B | OTHER | Ar3 | α' | REMARKS |
|---|---|---|---|---|---|---|
| A | | | | 657 | 25 | INVENTIVE STEEL |
| B | | | | 720 | 35 | INVENTIVE STEEL |
| C | | | | 710 | 40 | INVENTIVE STEEL |
| D | | | | 660 | 40 | INVENTIVE STEEL |
| E | | | | 671 | 40 | INVENTIVE STEEL |
| F | | 0.0020 | | 735 | 45 | INVENTIVE STEEL |
| G | | | Mg: 0.002 | 730 | 50 | INVENTIVE STEEL |
| H | | 0.0030 | | 758 | 35 | INVENTIVE STEEL |
| I | | 0.0030 | | 715 | 50 | INVENTIVE STEEL |
| J | 0.300 | | | 623 | 40 | INVENTIVE STEEL |
| K | | 0.0040 | Cu: 0.5, Ni: 0.3 | 760 | 40 | INVENTIVE STEEL |
| L | | 0.0030 | Ca: 0.0020 | 728 | 33 | INVENTIVE STEEL |
| M | | | V: 0.1 | 724 | 28 | INVENTIVE STEEL |
| N | | | W: 0.06 | 696 | 23 | INVENTIVE STEEL |
| O | | | Ce: 0.0025 | 723 | 18 | INVENTIVE STEEL |
| P | | | Zr: 0.04 | 722 | 13 | INVENTIVE STEEL |
| Q | | | La: 0.0025 | 685 | 8 | INVENTIVE STEEL |
| R | | | REM: 0.0027 | 716 | 3 | INVENTIVE STEEL |
| S | | | Sn: 0.1 | 715 | −2 | INVENTIVE STEEL |
| T | | | Sb: 0.2 | 737 | −7 | INVENTIVE STEEL |
| a | | | | 647 | 55 | COMPARATIVE STEEL |
| b | | | | 649 | 40 | COMPARATIVE STEEL |
| c | | | | 765 | 30 | COMPARATIVE STEEL |
| d | | 0.0030 | | 816 | 30 | COMPARATIVE STEEL |
| e | | 0.0030 | | 780 | 50 | COMPARATIVE STEEL |
| f | | | | 730 | 40 | COMPARATIVE STEEL |
| g | | | | 701 | 40 | COMPARATIVE STEEL |
| h | 1.200 | 0.0020 | | 688 | 45 | COMPARATIVE STEEL |
| i | | 0.0060 | | 760 | 40 | COMPARATIVE STEEL |

The cast slabs having the component compositions listed in Table 1 were heated and subjected to hot rolling, acid pickling, leveler, and then subjected to cold rolling to manufacture steel sheets each having a sheet thickness of 1.6 mm. The steel sheets were annealed, cooled, and subjected to plating after the cooling under conditions listed in Table 2 to Table 6.

TABLE 2

| TREATMENT NUMBER | HEATING TEMPERATURE °C. | FINISHING TEMPERATURE °C. | COILING TEMPERATURE °C. | TREATMENT OF HOT-ROLLED SHEET | COLD ROLLING RATIO % |
|---|---|---|---|---|---|
| A1 | 1200 | 880 | 600 | LEVELER | <u>20</u> |
| A2 | 1200 | 880 | 600 | LEVELER | 35 |
| A3 | 1200 | 880 | 600 | LEVELER | 60 |
| A4 | 1200 | 880 | 560 | LEVELER | 60 |
| A5 | 1200 | 880 | 640 | LEVELER | 60 |
| A6 | 1200 | 880 | <u>720</u> | LEVELER | 60 |
| A7 | 1200 | 880 | 560 | LEVELER | 60 |
| A8 | 1200 | 880 | 560 | LEVELER | 60 |
| A9 | 1200 | 880 | 560 | LEVELER | 60 |
| A10 | 1200 | 880 | 650 | LEVELER | 60 |
| A11 | 1200 | 880 | 560 | LEVELER | 60 |
| A12 | 1200 | 880 | 560 | LEVELER | 60 |
| A13 | 1200 | 880 | 560 | LEVELER | 60 |
| A14 | 1200 | 880 | 560 | LEVELER | 60 |
| A15 | 1200 | 880 | 560 | LEVELER | 60 |
| B1 | 1200 | 860 | 600 | LEVELER | 65 |
| B2 | 1200 | 860 | 600 | LEVELER | 65 |
| B3 | 1200 | 860 | 600 | LEVELER | 65 |
| B4 | 1200 | 860 | 600 | NO | 65 |
| B6 | 1200 | 860 | 600 | LEVELER | 65 |
| C1 | 1280 | 900 | 550 | LEVELER | 60 |
| C2 | 1280 | 900 | 550 | LEVELER | 60 |
| C3 | 1280 | 900 | 550 | LEVELER | 60 |
| C4 | 1280 | 900 | 550 | LEVELER | 60 |
| C5 | 1280 | 900 | 550 | LEVELER | 60 |
| C6 | 1280 | 900 | 550 | LEVELER | 60 |
| C7 | 1280 | 900 | 500 | LEVELER | 60 |
| C8 | 1280 | 900 | 500 | LEVELER | 60 |
| C9 | 1280 | 900 | 550 | NO | 60 |
| D1 | 1150 | 900 | 500 | LEVELER | 50 |
| D2 | 1150 | 900 | 500 | LEVELER | 50 |
| D3 | 1150 | 900 | 500 | LEVELER | 50 |
| D4 | 1150 | 900 | 500 | LEVELER | 50 |
| D5 | 1150 | 900 | 500 | LEVELER | 50 |
| D6 | 1150 | 900 | 500 | LEVELER | 50 |
| D7 | 1150 | 900 | 500 | LEVELER | 50 |
| D8 | 1150 | 900 | 500 | LEVELER | 50 |
| E1 | 1250 | 900 | 650 | LEVELER | 55 |
| E2 | 1250 | 900 | 650 | LEVELER | 55 |
| E3 | 1250 | 900 | 650 | LEVELER | 55 |
| E4 | 1250 | 900 | 650 | LEVELER | 55 |
| E5 | 1250 | 900 | 650 | LEVELER | 55 |
| F1 | 1250 | 910 | 550 | LEVELER | 60 |
| F2 | 1250 | 910 | 550 | LEVELER | 60 |
| F3 | 1250 | 910 | 550 | LEVELER | 60 |
| F4 | 1250 | 910 | 550 | LEVELER | 60 |
| F5 | 1250 | 910 | <u>730</u> | LEVELER | 60 |
| F6 | 1250 | 910 | 600 | LEVELER | 60 |
| F7 | 1250 | 910 | 550 | LEVELER | <u>15</u> |
| G1 | 1250 | 900 | 450 | LEVELER | 40 |
| G2 | 1250 | 900 | 450 | LEVELER | 40 |
| G3 | 1250 | 900 | 450 | NO | 65 |
| G5 | 1250 | 900 | 450 | LEVELER | 40 |
| G9 | 1250 | 900 | 450 | NO | 40 |
| H1 | 1200 | 890 | 550 | LEVELER | 55 |
| H2 | 1200 | 890 | 550 | LEVELER | 55 |
| I1 | 1250 | 890 | 550 | LEVELER | 45 |
| J1 | 1200 | 880 | 600 | LEVELER | 45 |
| K1 | 1250 | 880 | 600 | LEVELER | 60 |
| L1 | 1280 | 910 | 600 | LEVELER | 45 |
| L2 | <u>1050</u> | 910 | 600 | LEVELER | 45 |
| M1 | 1250 | 900 | 580 | LEVELER | 60 |
| N1 | 1250 | 900 | 570 | LEVELER | 60 |
| O1 | 1250 | 900 | 590 | LEVELER | 60 |
| P1 | 1250 | 900 | 550 | LEVELER | 60 |
| Q1 | 1250 | 900 | 560 | LEVELER | 60 |

TABLE 2-continued

| | | | | | |
|---|---|---|---|---|---|
| R1 | 1250 | 900 | 570 | LEVELER | 60 |
| S1 | 1250 | 900 | 560 | LEVELER | 60 |
| T1 | 1250 | 900 | 550 | LEVELER | 60 |
| a1 | 1200 | 900 | 550 | LEVELER | 50 |
| b1 | 1200 | 900 | 550 | LEVELER | 50 |
| c1 | 1280 | 900 | 550 | LEVELER | 50 |
| d1 | 1200 | 900 | 550 | LEVELER | 50 |
| e1 | 1200 | 900 | 550 | LEVELER | 50 |
| f1 | 1280 | 900 | 550 | LEVELER | 50 |
| g1 | 1280 | 900 | 550 | LEVELER | 50 |
| h1 | 1280 | 900 | 550 | LEVELER | 50 |
| i1 | 1280 | 900 | 550 | LEVELER | 50 |

| TREATMENT NUMBER | FURNACE ATMOSPHERE (PREHEATING ZONE) $\log(P_{H2O}/P_{H2})$ — | FURNACE $H_2$ CONCENTRATION volume % | FURNACE ATMOSPHERE (SOAKING ZONE) $\log(P_{H2O}/P_{H2})$ — | REMARKS |
|---|---|---|---|---|
| A1 | −0.8 | 5 | −0.9 | COMPARATIVE STEEL |
| A2 | −1.1 | 5 | −0.9 | INVENTIVE STEEL |
| A3 | −0.6 | 5 | −0.8 | INVENTIVE STEEL |
| A4 | −0.8 | 5 | −0.9 | INVENTIVE STEEL |
| A5 | −0.9 | 5 | −1.0 | INVENTIVE STEEL |
| A6 | −0.8 | 5 | −0.9 | COMPARATIVE STEEL |
| A7 | −0.8 | 5 | −0.9 | INVENTIVE STEEL |
| A8 | −0.8 | 5 | −0.8 | INVENTIVE STEEL |
| A9 | −1.1 | 5 | −1.0 | COMPARATIVE STEEL |
| A10 | −0.6 | 5 | −0.8 | INVENTIVE STEEL |
| A11 | −1.1 | 5 | −1.0 | COMPARATIVE STEEL |
| A12 | <u>−0.1</u> | 5 | −0.6 | COMPARATIVE STEEL |
| A13 | <u>−1.9</u> | 5 | −1.2 | COMPARATIVE STEEL |
| A14 | −0.2 | 5 | −1.1 | INVENTIVE STEEL |
| A15 | −1.7 | 5 | −0.7 | INVENTIVE STEEL |
| B1 | −0.6 | 6 | −0.8 | COMPARATIVE STEEL |
| B2 | −0.8 | 6 | −0.8 | INVENTIVE STEEL |
| B3 | −0.9 | 6 | −0.9 | INVENTIVE STEEL |
| B4 | −0.9 | 6 | −0.9 | COMPARATIVE STEEL |
| B6 | −0.8 | 6 | −0.9 | COMPARATIVE STEEL |
| C1 | −0.5 | 5 | −0.8 | COMPARATIVE STEEL |
| C2 | −0.8 | 5 | −0.8 | INVENTIVE STEEL |
| C3 | −1.0 | 5 | −0.9 | COMPARATIVE STEEL |
| C4 | −0.9 | 5 | −1.7 | INVENTIVE STEEL |
| C5 | −0.8 | 5 | <u>−2.0</u> | COMPARATIVE STEEL |
| C6 | −0.8 | 5 | <u>−0.1</u> | COMPARATIVE STEEL |
| C7 | −0.8 | 5 | −0.2 | INVENTIVE STEEL |
| C8 | −1.1 | 5 | −0.4 | INVENTIVE STEEL |
| C9 | −0.8 | 5 | −0.8 | COMPARATIVE STEEL |
| D1 | −0.8 | 5 | −0.9 | COMPARATIVE STEEL |
| D2 | −0.8 | 5 | −0.9 | INVENTIVE STEEL |
| D3 | −1.1 | 5 | −1.0 | INVENTIVE STEEL |
| D4 | −0.9 | 5 | −0.9 | COMPARATIVE STEEL |
| D5 | −0.8 | 5 | −0.9 | COMPARATIVE STEEL |
| D6 | −0.8 | 5 | −0.9 | INVENTIVE STEEL |
| D7 | −1.1 | 5 | −1.0 | INVENTIVE STEEL |
| D8 | −0.6 | 5 | −0.8 | COMPARATIVE STEEL |
| E1 | −0.8 | 5 | −0.8 | COMPARATIVE STEEL |
| E2 | −0.7 | 5 | −0.9 | INVENTIVE STEEL |
| E3 | −0.9 | 5 | −0.9 | INVENTIVE STEEL |
| E4 | −0.7 | 5 | −0.9 | INVENTIVE STEEL |
| E5 | −0.5 | 5 | −0.8 | COMPARATIVE STEEL |
| F1 | −0.8 | 5 | −0.9 | COMPARATIVE STEEL |
| F2 | −1.0 | 5 | −0.9 | INVENTIVE STEEL |
| F3 | −0.9 | 5 | −0.9 | INVENTIVE STEEL |
| F4 | −0.8 | 5 | −0.9 | INVENTIVE STEEL |
| F5 | −0.8 | 5 | −0.9 | COMPARATIVE STEEL |
| F6 | −1.1 | 5 | −0.9 | COMPARATIVE STEEL |
| F7 | −0.6 | 5 | −0.8 | COMPARATIVE STEEL |
| G1 | −0.6 | 5 | −0.8 | COMPARATIVE STEEL |
| G2 | −0.7 | 5 | −0.8 | INVENTIVE STEEL |
| G3 | −0.9 | 5 | −1.0 | COMPARATIVE STEEL |
| G5 | −0.7 | 5 | −0.8 | COMPARATIVE STEEL |
| G9 | −0.7 | 5 | −0.8 | COMPARATIVE STEEL |
| H1 | −0.8 | 5 | −0.9 | INVENTIVE STEEL |
| H2 | −0.9 | 5 | −0.8 | COMPARATIVE STEEL |
| I1 | −0.7 | 5 | −0.9 | INVENTIVE STEEL |
| J1 | −0.9 | 5 | −0.9 | INVENTIVE STEEL |
| K1 | −0.7 | 5 | −0.8 | INVENTIVE STEEL |

TABLE 2-continued

| | | | | |
|---|---|---|---|---|
| L1 | −1.1 | 5 | −0.9 | INVENTIVE STEEL |
| L2 | −0.6 | 5 | −0.7 | COMPARATIVE STEEL |
| M1 | −1.1 | 5 | −1.0 | INVENTIVE STEEL |
| N1 | −1.1 | 5 | −0.9 | INVENTIVE STEEL |
| O1 | −0.6 | 5 | −0.8 | INVENTIVE STEEL |
| P1 | −0.8 | 5 | −0.9 | INVENTIVE STEEL |
| Q1 | −0.9 | 5 | −0.9 | INVENTIVE STEEL |
| R1 | −0.7 | 5 | −0.8 | INVENTIVE STEEL |
| S1 | −0.8 | 5 | −0.8 | INVENTIVE STEEL |
| T1 | −0.9 | 5 | −0.9 | INVENTIVE STEEL |
| a1 | −1.1 | 5 | −1.0 | COMPARATIVE STEEL |
| b1 | −0.6 | 5 | −0.8 | COMPARATIVE STEEL |
| c1 | −0.8 | 5 | −0.8 | COMPARATIVE STEEL |
| d1 | −0.9 | 5 | −0.8 | COMPARATIVE STEEL |
| e1 | −0.7 | 5 | −0.9 | COMPARATIVE STEEL |
| f1 | −0.6 | 5 | −0.8 | COMPARATIVE STEEL |
| g1 | −0.8 | 5 | −0.9 | COMPARATIVE STEEL |
| h1 | −0.9 | 5 | −0.9 | COMPARATIVE STEEL |
| i1 | −0.7 | 5 | −0.8 | COMPARATIVE STEEL |

TABLE 3

| TREATMENT NUMBER | HEATING RATE °C./s | ATTAINED TEMPERATURE °C. | HOLDING TIME sec | FORMULA (A) RIGHT SIDE °C./s | COOLING RATE °C./s |
|---|---|---|---|---|---|
| A1 | 10 | 780 | 160 | 0.2 | 2.5 |
| A2 | 10 | 780 | 160 | 0.2 | 2.5 |
| A3 | 10 | 780 | 160 | 0.2 | 2.5 |
| A4 | 10 | 780 | 160 | 0.2 | 2.5 |
| A5 | 10 | 780 | 160 | 0.2 | 2.5 |
| A6 | 10 | 780 | 160 | 0.2 | 2.5 |
| A7 | 10 | 780 | 160 | 0.2 | 2.5 |
| A8 | 10 | 780 | 160 | 0.2 | 2.5 |
| A9 | 10 | 780 | 160 | 0.2 | 2.5 |
| A10 | 10 | 780 | 160 | 0.2 | 2.5 |
| A11 | 10 | 780 | 160 | 0.2 | 2.5 |
| A12 | 10 | 780 | 160 | 0.2 | 50.0 |
| A13 | 10 | 780 | 160 | 0.2 | 50.0 |
| A14 | 10 | 780 | 160 | 0.2 | 50.0 |
| A15 | 10 | 780 | 160 | 0.2 | 50.0 |
| B1 | 20 | 820 | 200 | 1.9 | 1.0 |
| B2 | 20 | 820 | 200 | 1.9 | 5.0 |
| B3 | 20 | 820 | 200 | 1.9 | 50.0 |
| B4 | 20 | 820 | 200 | 1.9 | 50.0 |
| B6 | 20 | 820 | 200 | 1.9 | 50.0 |
| C1 | 15 | 785 | 15 | 1.8 | 2.0 |
| C2 | 15 | 785 | 180 | 1.8 | 2.0 |
| C3 | 15 | 785 | 2400 | 1.8 | 2.0 |
| C4 | 15 | 785 | 180 | 1.8 | 2.0 |
| C5 | 15 | 785 | 180 | 1.8 | 2.0 |
| C6 | 15 | 785 | 180 | 1.8 | 2.0 |
| C7 | 15 | 785 | 180 | 1.8 | 2.0 |
| C8 | 15 | 785 | 180 | 1.8 | 2.0 |
| C9 | 15 | 785 | 180 | 1.8 | 2.0 |
| D1 | 100 | 710 | 100 | 0.8 | 1.0 |
| D2 | 100 | 800 | 100 | 0.8 | 1.0 |
| D3 | 100 | 800 | 100 | 0.8 | 1.0 |
| D4 | 100 | 800 | 100 | 0.8 | 1.0 |
| D5 | 100 | 800 | 100 | 0.8 | 1.0 |
| D6 | 100 | 800 | 100 | 0.8 | 1.0 |
| D7 | 100 | 800 | 100 | 0.8 | 1.0 |
| D8 | 100 | 800 | 100 | 0.8 | 1.0 |
| E1 | 0.5 | 800 | 90 | 0.5 | 2.5 |
| E2 | 3 | 800 | 90 | 0.5 | 2.5 |
| E3 | 10 | 800 | 90 | 0.5 | 2.5 |
| E4 | 100 | 800 | 90 | 0.5 | 2.5 |
| E5 | 10 | 800 | 90 | 0.5 | 2.5 |
| F1 | 10 | 920 | 120 | 1.6 | 5.8 |
| F2 | 10 | 780 | 120 | 1.6 | 5.8 |
| F3 | 10 | 800 | 120 | 1.6 | 5.8 |
| F4 | 10 | 820 | 120 | 1.6 | 5.8 |
| F5 | 10 | 800 | 120 | 1.6 | 5.8 |
| F6 | 10 | 800 | 120 | 1.6 | 5.8 |
| F7 | 10 | 800 | 120 | 1.6 | 5.8 |
| G1 | 0.7 | 750 | 300 | 1.3 | 30.0 |

TABLE 3-continued

| | | | | | |
|---|---|---|---|---|---|
| G2 | 35 | 810 | 180 | 1.3 | 30.0 |
| G3 | 20 | 810 | 200 | 1.3 | 50.0 |
| G5 | 35 | 810 | 90 | 1.3 | 30.0 |
| G9 | 35 | 810 | 180 | 1.3 | 30.0 |
| H1 | 35 | 800 | 60 | 2.2 | 5.0 |
| H2 | 35 | 800 | 60 | 2.2 | 5.0 |
| I1 | 35 | 800 | 60 | 1.8 | 5.0 |
| J1 | 35 | 780 | 60 | 0.1 | 5.0 |
| K1 | 35 | 800 | 60 | 1.7 | 5.0 |
| L1 | 20 | 840 | 60 | 1.9 | 4.0 |
| L2 | 20 | 840 | 60 | 1.9 | 4.0 |
| M1 | 10 | 780 | 160 | 2.6 | 5.0 |
| N1 | 10 | 780 | 160 | 0.8 | 5.0 |
| O1 | 10 | 780 | 160 | 3.4 | 5.0 |
| P1 | 10 | 780 | 160 | 1.9 | 5.0 |
| Q1 | 10 | 780 | 160 | 0.6 | 5.0 |
| R1 | 10 | 780 | 160 | 1.5 | 5.0 |
| S1 | 10 | 780 | 160 | 2.4 | 5.0 |
| T1 | 10 | 780 | 160 | 3.6 | 5.0 |
| a1 | 10 | 800 | 160 | 0.1 | 2.0 |
| b1 | 10 | 800 | 160 | 0.1 | 2.0 |
| c1 | 10 | 800 | 160 | 1.5 | 2.0 |
| d1 | 10 | 800 | 160 | 22.3 | 30.0 |
| e1 | 10 | 800 | 160 | 4.0 | 30.0 |
| f1 | 10 | 800 | 160 | 7.0 | 30.0 |
| g1 | 10 | 780 | 160 | 6.5 | 30.0 |
| h1 | 10 | 800 | 160 | 0.0 | 30.0 |
| i1 | 10 | 800 | 160 | 1.1 | 30.0 |

| TREATMENT NUMBER | FORMULA (B) RIGHT SIDE ° C. | COOLING STOP TEMPERATURE T ° C. | REMARKS |
|---|---|---|---|
| A1 | 443 | 520 | COMPARATIVE STEEL |
| A2 | 443 | 520 | INVENTIVE STEEL |
| A3 | 443 | 520 | INVENTIVE STEEL |
| A4 | 443 | 520 | INVENTIVE STEEL |
| A5 | 443 | 520 | INVENTIVE STEEL |
| A6 | 443 | 520 | COMPARATIVE STEEL |
| A7 | 443 | 520 | INVENTIVE STEEL |
| A8 | 443 | 520 | INVENTIVE STEEL |
| A9 | 443 | 520 | COMPARATIVE STEEL |
| A10 | 443 | 520 | INVENTIVE STEEL |
| A11 | 443 | 520 | COMPARATIVE STEEL |
| A12 | 443 | 520 | COMPARATIVE STEEL |
| A13 | 443 | 520 | COMPARATIVE STEEL |
| A14 | 443 | 520 | INVENTIVE STEEL |
| A15 | 443 | 520 | INVENTIVE STEEL |
| B1 | 490 | 500 | COMPARATIVE STEEL |
| B2 | 490 | 500 | INVENTIVE STEEL |
| B3 | 490 | 500 | INVENTIVE STEEL |
| B4 | 490 | 500 | COMPARATIVE STEEL |
| B6 | 490 | 500 | COMPARATIVE STEEL |
| C1 | 483 | 490 | COMPARATIVE STEEL |
| C2 | 483 | 490 | INVENTIVE STEEL |
| C3 | 483 | 490 | COMPARATIVE STEEL |
| C4 | 483 | 490 | INVENTIVE STEEL |
| C5 | 483 | 490 | COMPARATIVE STEEL |
| C6 | 483 | 490 | COMPARATIVE STEEL |
| C7 | 483 | 490 | INVENTIVE STEEL |
| C8 | 483 | 490 | INVENTIVE STEEL |
| C9 | 483 | 490 | COMPARATIVE STEEL |
| D1 | 469 | 460 | COMPARATIVE STEEL |
| D2 | 469 | 500 | INVENTIVE STEEL |
| D3 | 469 | 540 | INVENTIVE STEEL |
| D4 | 469 | 500 | COMPARATIVE STEEL |
| D5 | 469 | 500 | COMPARATIVE STEEL |
| D6 | 469 | 500 | INVENTIVE STEEL |
| D7 | 469 | 500 | INVENTIVE STEEL |
| D8 | 469 | 500 | COMPARATIVE STEEL |
| E1 | 465 | 500 | COMPARATIVE STEEL |
| E2 | 465 | 500 | INVENTIVE STEEL |
| E3 | 465 | 500 | INVENTIVE STEEL |
| E4 | 465 | 500 | INVENTIVE STEEL |
| E5 | 465 | 430 | COMPARATIVE STEEL |
| F1 | 512 | 525 | COMPARATIVE STEEL |
| F2 | 512 | 525 | INVENTIVE STEEL |
| F3 | 512 | 525 | INVENTIVE STEEL |
| F4 | 512 | 525 | INVENTIVE STEEL |

TABLE 3-continued

| | | | |
|---|---|---|---|
| F5 | 512 | 525 | COMPARATIVE STEEL |
| F6 | 512 | 525 | COMPARATIVE STEEL |
| F7 | 512 | 525 | COMPARATIVE STEEL |
| G1 | 493 | 510 | COMPARATIVE STEEL |
| G2 | 493 | 510 | INVENTIVE STEEL |
| G3 | 493 | 500 | COMPARATIVE STEEL |
| G5 | 493 | 510 | COMPARATIVE STEEL |
| G9 | 493 | 510 | COMPARATIVE STEEL |
| H1 | 516 | 530 | INVENTIVE STEEL |
| H2 | 516 | 530 | COMPARATIVE STEEL |
| I1 | 501 | 520 | INVENTIVE STEEL |
| J1 | 397 | 430 | INVENTIVE STEEL |
| K1 | 522 | 540 | INVENTIVE STEEL |
| L1 | 515 | 520 | INVENTIVE STEEL |
| L2 | 515 | 520 | COMPARATIVE STEEL |
| M1 | 501 | 520 | INVENTIVE STEEL |
| N1 | 476 | 520 | INVENTIVE STEEL |
| O1 | 508 | 520 | INVENTIVE STEEL |
| P1 | 495 | 520 | INVENTIVE STEEL |
| Q1 | 460 | 520 | INVENTIVE STEEL |
| R1 | 493 | 520 | INVENTIVE STEEL |
| S1 | 501 | 520 | INVENTIVE STEEL |
| T1 | 511 | 520 | INVENTIVE STEEL |
| a1 | 433 | 500 | COMPARATIVE STEEL |
| b1 | 402 | 500 | COMPARATIVE STEEL |
| c1 | 496 | 500 | COMPARATIVE STEEL |
| d1 | 603 | 650 | COMPARATIVE STEEL |
| e1 | 523 | 550 | COMPARATIVE STEEL |
| f1 | 519 | 550 | COMPARATIVE STEEL |
| g1 | 519 | 550 | COMPARATIVE STEEL |
| h1 | 382 | 450 | COMPARATIVE STEEL |
| i1 | 522 | 550 | COMPARATIVE STEEL |

TABLE 4

| TREATMENT NUMBER | BENDING RADIUS mm | NUMBER OF TIMES time(s) | GALVANIZING BATH TEMPERATURE °C. | IMMERSED SHEET TEMPERATURE °C. | GALVANNEALING TREATMENT TEMPERATURE °C. |
|---|---|---|---|---|---|
| A1 | 500 | 5 | 460 | 470 | 520 |
| A2 | 500 | 5 | 460 | 470 | 520 |
| A3 | 500 | 5 | 460 | 470 | 520 |
| A4 | 500 | 5 | 460 | 470 | 520 |
| A5 | 500 | 5 | 460 | 470 | 520 |
| A6 | 500 | 5 | 460 | 470 | 520 |
| A7 | 680 | 5 | 460 | 470 | 520 |
| A8 | 780 | 5 | 460 | 470 | 520 |
| A9 | 850 | 5 | 460 | 470 | 520 |
| A10 | 775 | 5 | 460 | 470 | 520 |
| A11 | — | 0 | 460 | 470 | 520 |
| A12 | 500 | 5 | 460 | 470 | 520 |
| A13 | 500 | 5 | 460 | 470 | 520 |
| A14 | 500 | 5 | 460 | 470 | 520 |
| A15 | 500 | 5 | 460 | 470 | 520 |
| B1 | 460 | 2 | 460 | 470 | 520 |
| B2 | 460 | 2 | 460 | 470 | 520 |
| B3 | 460 | 2 | 460 | 470 | 520 |
| B4 | 460 | 2 | 460 | 470 | 520 |
| B6 | — | 0 | 460 | 470 | 520 |
| C1 | 460 | 3 | 460 | 470 | 520 |
| C2 | 460 | 3 | 460 | 470 | 520 |
| C3 | 460 | 3 | 460 | 470 | 520 |
| C4 | 460 | 3 | 460 | 470 | 520 |
| C5 | 460 | 3 | 460 | 470 | 520 |
| C6 | 460 | 3 | 460 | 470 | 520 |
| C7 | 460 | 5 | 460 | 470 | 520 |
| C8 | 460 | 5 | 460 | 470 | 520 |
| C9 | 460 | 3 | 460 | 470 | 520 |
| D1 | 460 | 5 | 460 | 470 | 560 |
| D2 | 460 | 5 | 460 | 470 | 560 |
| D3 | 460 | 5 | 460 | 470 | 560 |
| D4 | 460 | 5 | 460 | 470 | 630 |
| D5 | 460 | 5 | 460 | 470 | 560 |
| D6 | 460 | 5 | 460 | 470 | 560 |
| D7 | 460 | 5 | 460 | 470 | 560 |
| D8 | 460 | 5 | 460 | 470 | 560 |

TABLE 4-continued

| | | | | | |
|---|---|---|---|---|---|
| E1 | 460 | 5 | 460 | 470 | 520 |
| E2 | 460 | 5 | 460 | 470 | 520 |
| E3 | 460 | 5 | 460 | 470 | 520 |
| E4 | 460 | 5 | 460 | 470 | 520 |
| E5 | 460 | 5 | 460 | 470 | 520 |
| F1 | 460 | 4 | 460 | 470 | 540 |
| F2 | 460 | 4 | 460 | 470 | 540 |
| F3 | 460 | 4 | 460 | 470 | 540 |
| F4 | 460 | 4 | 460 | 470 | 540 |
| F5 | 460 | 4 | 460 | 470 | 540 |
| F6 | <u>850</u> | 4 | 460 | 470 | 540 |
| F7 | 460 | 4 | 460 | 470 | 540 |
| G1 | 460 | 5 | 460 | 470 | 520 |
| G2 | 460 | 5 | 460 | 470 | 520 |
| G3 | 460 | 5 | 460 | 470 | 520 |
| G5 | 460 | 5 | <u>435</u> | 470 | 520 |
| G9 | 460 | 5 | 460 | 470 | 520 |
| H1 | 460 | 5 | 460 | 470 | 520 |
| H2 | 460 | 5 | <u>435</u> | 470 | 520 |
| I1 | 460 | 5 | 460 | 470 | 520 |
| J1 | 460 | 5 | 460 | 470 | 520 |
| K1 | 460 | 5 | 460 | 470 | 520 |
| L1 | 460 | 5 | 460 | 470 | 520 |
| L2 | 460 | 5 | 460 | 470 | 520 |
| M1 | 500 | 5 | 460 | 470 | 520 |
| N1 | 500 | 5 | 460 | 470 | 520 |
| O1 | 500 | 5 | 460 | 470 | 540 |
| P1 | 500 | 5 | 460 | 470 | 560 |
| Q1 | 500 | 5 | 460 | 470 | 540 |
| R1 | 500 | 5 | 460 | 470 | 520 |
| S1 | 500 | 5 | 460 | 470 | 520 |
| T1 | 500 | 5 | 460 | 470 | 540 |
| a1 | 460 | 5 | 460 | 470 | 540 |
| b1 | 460 | 5 | 460 | 470 | 540 |
| c1 | 460 | 5 | 460 | 470 | 540 |
| d1 | 460 | 5 | 460 | 470 | 540 |
| e1 | 460 | 5 | 460 | 470 | 540 |
| f1 | 460 | 5 | 460 | 470 | 540 |
| g1 | 460 | 5 | 460 | 470 | 540 |
| h1 | 460 | 5 | 460 | 470 | 540 |
| i1 | 460 | 5 | 460 | 470 | 540 |

| TREATMENT NUMBER | GALVANNEALING TREATMENT TIME sec | COLD ROLLING RATIO (AFTER ANNEALING) % | REMARKS |
|---|---|---|---|
| A1 | 60 | 0.4 | COMPARATIVE STEEL |
| A2 | 60 | 0.4 | INVENTIVE STEEL |
| A3 | 60 | 0.4 | INVENTIVE STEEL |
| A4 | 60 | 0.4 | INVENTIVE STEEL |
| A5 | 60 | 0.4 | INVENTIVE STEEL |
| A6 | 60 | 0.4 | COMPARATIVE STEEL |
| A7 | 60 | 0.4 | INVENTIVE STEEL |
| A8 | 60 | 0.4 | INVENTIVE STEEL |
| A9 | 60 | 0.4 | COMPARATIVE STEEL |
| A10 | 60 | 0.4 | INVENTIVE STEEL |
| A11 | 60 | 0.4 | COMPARATIVE STEEL |
| A12 | 60 | 0.4 | COMPARATIVE STEEL |
| A13 | 60 | 0.4 | COMPARATIVE STEEL |
| A14 | 60 | 0.4 | INVENTIVE STEEL |
| A15 | 60 | 0.4 | INVENTIVE STEEL |
| B1 | 30 | 0.6 | COMPARATIVE STEEL |
| B2 | 30 | 0.6 | INVENTIVE STEEL |
| B3 | 30 | 0.6 | INVENTIVE STEEL |
| B4 | 30 | 0.6 | COMPARATIVE STEEL |
| B6 | 30 | 0.6 | COMPARATIVE STEEL |
| C1 | 30 | 0.2 | COMPARATIVE STEEL |
| C2 | 30 | 0.2 | INVENTIVE STEEL |
| C3 | 30 | 0.2 | COMPARATIVE STEEL |
| C4 | 30 | 0.2 | INVENTIVE STEEL |
| C5 | 30 | 0.2 | COMPARATIVE STEEL |
| C6 | 30 | 0.2 | COMPARATIVE STEEL |
| C7 | 30 | 0.2 | INVENTIVE STEEL |
| C8 | 30 | 0.2 | INVENTIVE STEEL |
| C9 | 30 | 0.2 | COMPARATIVE STEEL |
| D1 | 30 | 0.4 | COMPARATIVE STEEL |
| D2 | 30 | 0.4 | INVENTIVE STEEL |

TABLE 4-continued

| | | | |
|---|---|---|---|
| D3 | 30 | 0.4 | INVENTIVE STEEL |
| D4 | 30 | 0.4 | COMPARATIVE STEEL |
| D5 | 1 | 0.4 | COMPARATIVE STEEL |
| D6 | 6 | 0.4 | INVENTIVE STEEL |
| D7 | 99 | 0.4 | INVENTIVE STEEL |
| D8 | 500 | 0.4 | COMPARATIVE STEEL |
| E1 | 30 | 0.4 | COMPARATIVE STEEL |
| E2 | 30 | 0.4 | INVENTIVE STEEL |
| E3 | 30 | 0.4 | INVENTIVE STEEL |
| E4 | 30 | 0.4 | INVENTIVE STEEL |
| E5 | 30 | 0.4 | COMPARATIVE STEEL |
| F1 | 30 | 0.4 | COMPARATIVE STEEL |
| F2 | 30 | 0.4 | INVENTIVE STEEL |
| F3 | 30 | 0.4 | INVENTIVE STEEL |
| F4 | 30 | 0.4 | INVENTIVE STEEL |
| F5 | 30 | 0.4 | COMPARATIVE STEEL |
| F6 | 30 | 0.4 | COMPARATIVE STEEL |
| F7 | 30 | 0.4 | COMPARATIVE STEEL |
| G1 | 30 | 0.4 | COMPARATIVE STEEL |
| G2 | 30 | 0.4 | INVENTIVE STEEL |
| G3 | 30 | 0.4 | COMPARATIVE STEEL |
| G5 | 30 | 0.4 | COMPARATIVE STEEL |
| G9 | 30 | 0.4 | COMPARATIVE STEEL |
| H1 | 30 | 0.4 | INVENTIVE STEEL |
| H2 | 30 | 0.4 | COMPARATIVE STEEL |
| I1 | 30 | 0.4 | INVENTIVE STEEL |
| J1 | 30 | 0.4 | INVENTIVE STEEL |
| K1 | 30 | 0.4 | INVENTIVE STEEL |
| L1 | 30 | 0.4 | INVENTIVE STEEL |
| L2 | 30 | 0.4 | COMPARATIVE STEEL |
| M1 | 30 | 0.4 | INVENTIVE STEEL |
| N1 | 30 | 0.4 | INVENTIVE STEEL |
| O1 | 30 | 0.4 | INVENTIVE STEEL |
| P1 | 30 | 0.4 | INVENTIVE STEEL |
| Q1 | 30 | 0.4 | INVENTIVE STEEL |
| R1 | 30 | 0.4 | INVENTIVE STEEL |
| S1 | 30 | 0.4 | INVENTIVE STEEL |
| T1 | 30 | 0.4 | INVENTIVE STEEL |
| a1 | 30 | 0.4 | COMPARATIVE STEEL |
| b1 | 30 | 0.4 | COMPARATIVE STEEL |
| c1 | 30 | 0.4 | COMPARATIVE STEEL |
| d1 | 30 | 0.4 | COMPARATIVE STEEL |
| e1 | 30 | 0.4 | COMPARATIVE STEEL |
| f1 | 30 | 0.4 | COMPARATIVE STEEL |
| g1 | 30 | 0.4 | COMPARATIVE STEEL |
| h1 | 30 | 0.4 | COMPARATIVE STEEL |
| i1 | 30 | 0.4 | COMPARATIVE STEEL |

In the treatment number (alphabet+numeral) listed in Table 2 to Table 4 and later-explained Table 5 to Table 7, the alphabet indicates the steel having the component composition listed in Table 1 and the numeral indicates a number of the example. For example, Treatment Number "A1" indicates the first example carried out using Steel A whose component composition is listed in Table 1.

Table 2 to Table 4 list the cast slab heating temperature, Ar3, the finishing temperature of the hot rolling, the coiling temperature, the treatment of the hot-rolled steel sheet before the acid pickling, the rolling ratio of the cold rolling, the furnace atmosphere of the annealing, the heating rate at the annealing step, the attained temperature (maximum temperature), the holding time, the average cooling rate at the cooling step, and the cooling stop temperature. Further, the values on the right sides of Formula (A) and Formula (B) are additionally listed. In the inventive examples and some of comparative examples, a strain of 0.2% or more at most was added to the surface by the leveler.

Further, the bending radius and the number of bending times of the bending during the annealing, the galvanizing bath temperature, and the temperature of the sheet immersed in the plating bath are listed. Further, for the one subjected to the galvannealing treatment, its galvannealing treatment temperature and galvannealing treatment time are listed.

After the treatments on the conditions listed in Table 2 to Table 4 were performed on the steel sheets, the forms of the microstructures and the mechanical properties were measured and evaluated.

The fraction of each of structures in the microstructure, the thickness of the ferrite agglomerate, and the thickness of the decarburized layer were found by the aforementioned methods. The ferrite grain size in the decarburized layer and the number density of martensite grains each having an aspect ratio of 5 or more in the decarburized layer were calculated by observation under the scanning electron microscopy as follows.

In a region outside the half thickness of the decarburized layer in the decarburized layer, a region having an area of 40000 $\mu m^2$ or more was observed, and line segments parallel to the rolling direction were drawn, and an average value obtained by dividing the total of lengths of the line segments by the number of intersections of the line segments and the grain boundary was regarded as the ferrite grain size.

The number of martensite grains and the lengths of the minor axis and the major axis of each martensite grain were obtained, a value obtained by dividing the length of the major axis by the length of the minor axis was regarded as the aspect ratio, and the number density was calculated by dividing the number of martensite grains each having an aspect ratio of 5 or more by the number of all martensite grains. Further, as a difference in structure in the width direction, a difference in the number density obtained by dividing the number of martensite grains each having an aspect ratio of 5 or more of the martensite grains in the decarburized layer by the number of all martensite grains was also calculated.

The plating appearance was evaluated by the difference in Fe concentration in the width direction in the plating layer and the visual determination of the occurrence status of unplating. "X" represents the case where unplating having a diameter of 0.5 mm more was observed, which departed from the allowable range in appearance. "○" represents the case where unplating having a diameter of 0.5 mm more was not observed but the difference in Fe concentration in the width direction was 1.0 or more, and unevenness occurred. Further, "⊙" represents the other cases.

The plating adhesiveness during working during which the compressive stress was applied was evaluated by the peeling status after a 60° V-bending test. "X" represents the case where the peeling width is 7.0 mm or more which is practically unallowable, and "○" represents the other cases.

A test was carried out according to JIS Z 2241, and the mechanical properties (yield stress, tensile strength, extensibility, yield point extensibility) were evaluated. Regarding the hole expandability, a test was carried out according to JIS Z 2256. The fatigue property was measured by a plane bending fatigue test. As the test piece, a JIS No. 1 test piece was used, and the stress ratio was set to −1. The repetition frequency was set to 25 Hz, and the maximum number of repeated times was set to 2×10$^6$. A value obtained by dividing the strength at the fatigue limit by the maximum tensile strength was regarded as the fatigue limit ratio. Further, the difference in the fatigue limit ratio in the width direction was also calculated as the index representing whether the characteristics in the width direction of the steel sheet are uniform.

The measured results and the evaluation results are listed in Table 5 to Table 7.

TABLE 5

| TREATMENT NUMBER | FERRITE FRACTION % | RETAINED AUSTENITE FRACTION % | MARTENSITE FRACTION % | PERLITE FRACTION % | BAINITE | RATIO OF FERRITE AGGLOMERATES HAVING THICKNESS OF 20 μm OR LESS % |
|---|---|---|---|---|---|---|
| A1 | 62 | 0 | 35 | 1 | 3 | <u>43</u> |
| A2 | 60 | 2 | 35 | 1 | 3 | 60 |
| A3 | 58 | 1 | 38 | 1 | 3 | 87 |
| A4 | 57 | 1 | 38 | 1 | 4 | 89 |
| A5 | 57 | 1 | 37 | 1 | 5 | 86 |
| A6 | 59 | 1 | 37 | 1 | 3 | 88 |
| A7 | 57 | 1 | 38 | 1 | 4 | 88 |
| A8 | 57 | 1 | 39 | 1 | 3 | 89 |
| A9 | 58 | 1 | 38 | 1 | 3 | 87 |
| A10 | 61 | 1 | 37 | 1 | 1 | 87 |
| A11 | 57 | 1 | 38 | 1 | 4 | 87 |
| A12 | 57 | 1 | 38 | 0 | 4 | 70 |
| A13 | 56 | 1 | 39 | 0 | 4 | 71 |
| A14 | 58 | 1 | 38 | 0 | 3 | 72 |
| A15 | 57 | 1 | 37 | 0 | 5 | 70 |
| B1 | 56 | 1 | 18 | <u>12</u> | 13 | 65 |
| B2 | 42 | 1 | 47 | 0 | 10 | 81 |
| B3 | 32 | 1 | 55 | 0 | 12 | 81 |
| B4 | 30 | 1 | 55 | 0 | 14 | <u>40</u> |
| B6 | 29 | 1 | 54 | 0 | 16 | 75 |
| C1 | <u>89</u> | 0 | <u>2</u> | <u>9</u> | 0 | <u>41</u> |
| C2 | 60 | 2 | 32 | 0 | 6 | 75 |
| C3 | 50 | 1 | 38 | 0 | 11 | <u>44</u> |
| C4 | 62 | 0 | 38 | 0 | 0 | 75 |
| C5 | 60 | 0 | 32 | 0 | 8 | 71 |
| C6 | 62 | 0 | 33 | 0 | 5 | 55 |
| C7 | 60 | 0 | 34 | 0 | 6 | 72 |
| C8 | 61 | 0 | 34 | 0 | 5 | 76 |
| C9 | 60 | 2 | 32 | 0 | 6 | <u>45</u> |
| D1 | <u>89</u> | 0 | <u>1</u> | 1 | 9 | <u>7</u> |
| D2 | 60 | 0 | 24 | 1 | 15 | 72 |
| D3 | 62 | 0 | 32 | 1 | 5 | 63 |
| D4 | 68 | 0 | 18 | <u>14</u> | 0 | 65 |
| D5 | 65 | 0 | 35 | 0 | 0 | 64 |
| D6 | 64 | 0 | 34 | 0 | 2 | 65 |
| D7 | 63 | 0 | 35 | 0 | 2 | 66 |
| D8 | 66 | 0 | 18 | <u>14</u> | 2 | 65 |
| E1 | 78 | 0 | 18 | 0 | 4 | <u>42</u> |
| E2 | 76 | 0 | 19 | 0 | 5 | 55 |
| E3 | 73 | 0 | 21 | 0 | 6 | 76 |
| E4 | 68 | 0 | 24 | 0 | 8 | 79 |
| E5 | 68 | 0 | <u>8</u> | 0 | 24 | 74 |
| F1 | <u>10</u> | 2 | 55 | 0 | 33 | 88 |
| F2 | 70 | 1 | 28 | 0 | 1 | 90 |
| F3 | 58 | 1 | 35 | 0 | 6 | 85 |

TABLE 5-continued

| | | | | | | |
|---|---|---|---|---|---|---|
| F4 | 45 | 1 | 40 | 0 | 14 | 83 |
| F5 | 62 | 1 | 30 | 0 | 7 | 85 |
| F6 | 55 | 1 | 35 | 0 | 9 | 83 |
| F7 | 59 | 1 | 35 | 0 | 5 | 45 |
| G1 | 70 | 0 | 27 | 0 | 3 | 33 |
| G2 | 68 | 0 | 28 | 0 | 4 | 75 |
| G3 | 66 | 0 | 29 | 0 | 5 | 40 |
| G5 | 67 | 0 | 24 | 0 | 9 | 72 |
| G9 | 68 | 0 | 28 | 0 | 4 | 43 |
| H1 | 27 | 3 | 56 | 0 | 14 | 81 |
| H2 | 26 | 3 | 55 | 0 | 16 | 80 |
| I1 | 33 | 1 | 48 | 0 | 18 | 77 |
| J1 | 38 | 2 | 60 | 0 | 0 | 77 |
| K1 | 50 | 3 | 45 | 0 | 2 | 75 |
| L1 | 61 | 0 | 28 | 0 | 11 | 80 |
| L2 | 77 | 0 | 12 | 0 | 11 | 52 |
| M1 | 72 | 0 | 28 | 0 | 0 | 75 |
| N1 | 58 | 0 | 38 | 0 | 4 | 76 |
| O1 | 57 | 0 | 36 | 0 | 7 | 78 |
| P1 | 73 | 0 | 26 | 0 | 1 | 74 |
| Q1 | 60 | 0 | 37 | 0 | 3 | 76 |
| R1 | 68 | 0 | 32 | 0 | 0 | 78 |
| S1 | 67 | 0 | 33 | 0 | 0 | 72 |
| T1 | 68 | 0 | 32 | 0 | 0 | 73 |
| a1 | 7 | 0 | 93 | 0 | 0 | 100 |
| b1 | 33 | 0 | 63 | 0 | 4 | 81 |
| c1 | 82 | 0 | 18 | 0 | 0 | 35 |
| d1 | 93 | 0 | 0 | 7 | 0 | 43 |
| e1 | 83 | 0 | 13 | 0 | 4 | 48 |
| f1 | 62 | 0 | 34 | 0 | 4 | 61 |
| g1 | 60 | 0 | 38 | 0 | 2 | 63 |
| h1 | 48 | 0 | 45 | 0 | 7 | 71 |
| i1 | 60 | 0 | 35 | 0 | 5 | 62 |

| TREATMENT NUMBER | DECARBURIZED LAYER THICKNESS μm | FERRITE GRAIN SIZE IN DECARBURIZED LAYER μm | REMARKS |
|---|---|---|---|
| A1 | 48 | 19 | COMPARATIVE STEEL |
| A2 | 49 | 18 | INVENTIVE STEEL |
| A3 | 51 | 15 | INVENTIVE STEEL |
| A4 | 45 | 9 | INVENTIVE STEEL |
| A5 | 51 | 22 | INVENTIVE STEEL |
| A6 | 65 | 38 | COMPARATIVE STEEL |
| A7 | 50 | 19 | INVENTIVE STEEL |
| A8 | 49 | 22 | INVENTIVE STEEL |
| A9 | 51 | 33 | COMPARATIVE STEEL |
| A10 | 55 | 27 | INVENTIVE STEEL |
| A11 | 50 | 35 | COMPARATIVE STEEL |
| A12 | 200 | 34 | COMPARATIVE STEEL |
| A13 | 22 | 7 | COMPARATIVE STEEL |
| A14 | 145 | 28 | INVENTIVE STEEL |
| A15 | 35 | 7 | INVENTIVE STEEL |
| B1 | 48 | 19 | COMPARATIVE STEEL |
| B2 | 48 | 15 | INVENTIVE STEEL |
| B3 | 49 | 12 | INVENTIVE STEEL |
| B4 | 50 | 17 | COMPARATIVE STEEL |
| B6 | 60 | 42 | COMPARATIVE STEEL |
| C1 | 50 | 12 | COMPARATIVE STEEL |
| C2 | 48 | 7 | INVENTIVE STEEL |
| C3 | 68 | 21 | COMPARATIVE STEEL |
| C4 | 10 | 9 | INVENTIVE STEEL |
| C5 | 8 | 2 | COMPARATIVE STEEL |
| C6 | 200 | 35 | COMPARATIVE STEEL |
| C7 | 143 | 27 | INVENTIVE STEEL |
| C8 | 86 | 26 | INVENTIVE STEEL |
| C9 | 50 | 15 | COMPARATIVE STEEL |
| D1 | 38 | 9 | COMPARATIVE STEEL |
| D2 | 49 | 10 | INVENTIVE STEEL |
| D3 | 50 | 9 | INVENTIVE STEEL |
| D4 | 47 | 13 | COMPARATIVE STEEL |
| D5 | 51 | 8 | COMPARATIVE STEEL |
| D6 | 50 | 8 | INVENTIVE STEEL |
| D7 | 49 | 8 | INVENTIVE STEEL |
| D8 | 47 | 13 | COMPARATIVE STEEL |
| E1 | 48 | 23 | COMPARATIVE STEEL |
| E2 | 49 | 24 | INVENTIVE STEEL |

TABLE 5-continued

|  |  |  |  |
|---|---|---|---|
| E3 | 46 | 22 | INVENTIVE STEEL |
| E4 | 40 | 22 | INVENTIVE STEEL |
| E5 | 45 | 21 | COMPARATIVE STEEL |
| F1 | 60 | 18 | COMPARATIVE STEEL |
| F2 | 59 | 8 | INVENTIVE STEEL |
| F3 | 57 | 7 | INVENTIVE STEEL |
| F4 | 57 | 10 | INVENTIVE STEEL |
| F5 | 58 | 65 | COMPARATIVE STEEL |
| F6 | 56 | 61 | COMPARATIVE STEEL |
| F7 | 51 | 9 | COMPARATIVE STEEL |
| G1 | 55 | 9 | COMPARATIVE STEEL |
| G2 | 49 | 7 | INVENTIVE STEEL |
| G3 | 47 | 7 | COMPARATIVE STEEL |
| G5 | 43 | 8 | COMPARATIVE STEEL |
| G9 | 48 | 16 | COMPARATIVE STEEL |
| H1 | 51 | 8 | INVENTIVE STEEL |
| H2 | 51 | 8 | COMPARATIVE STEEL |
| I1 | 49 | 9 | INVENTIVE STEEL |
| J1 | 55 | 8 | INVENTIVE STEEL |
| K1 | 50 | 6 | INVENTIVE STEEL |
| L1 | 48 | 16 | INVENTIVE STEEL |
| L2 | 46 | 18 | COMPARATIVE STEEL |
| M1 | 51 | 13 | INVENTIVE STEEL |
| N1 | 51 | 8 | INVENTIVE STEEL |
| O1 | 48 | 12 | INVENTIVE STEEL |
| P1 | 39 | 8 | INVENTIVE STEEL |
| Q1 | 40 | 8 | INVENTIVE STEEL |
| R1 | 51 | 9 | INVENTIVE STEEL |
| S1 | 50 | 9 | INVENTIVE STEEL |
| T1 | 49 | 8 | INVENTIVE STEEL |
| a1 | 53 | 9 | COMPARATIVE STEEL |
| b1 | 48 | 9 | COMPARATIVE STEEL |
| c1 | 58 | 18 | COMPARATIVE STEEL |
| d1 | 79 | 22 | COMPARATIVE STEEL |
| e1 | 75 | 6 | COMPARATIVE STEEL |
| f1 | 55 | 7 | COMPARATIVE STEEL |
| g1 | 55 | 8 | COMPARATIVE STEEL |
| h1 | 48 | 9 | COMPARATIVE STEEL |
| i1 | 51 | 8 | COMPARATIVE STEEL |

TABLE 6

| TREATMENT NUMBER | NUMBER DENSITY OF ASPECT RATIO OF MARTENSITE IN DECARBURIZED LAYER >5 (f_MC) % | f_MC DIFFERENCE IN WIDTH DIRECTION % | DIFFERENCE IN FATIGUE LIMIT RATIO | Fe % | Fe CONCENTRATION DIFFERENCE IN WIDTH DIRECTION % | REMARKS |
|---|---|---|---|---|---|---|
| A1 | 21 | 3 | 0.03 | 11.6 | 0.3 | COMPARATIVE STEEL |
| A2 | 23 | 4 | 0.04 | 11.9 | 0.3 | INVENTIVE STEEL |
| A3 | 20 | 3 | 0.04 | 12.0 | 0.1 | INVENTIVE STEEL |
| A4 | 19 | 4 | 0.04 | 11.5 | 0.1 | INVENTIVE STEEL |
| A5 | 21 | 5 | 0.05 | 11.4 | 0.3 | INVENTIVE STEEL |
| A6 | 18 | 4 | 0.05 | 11.5 | 0.3 | COMPARATIVE STEEL |
| A7 | 18 | 5 | 0.04 | 11.1 | 0.4 | INVENTIVE STEEL |
| A8 | 19 | 4 | 0.05 | 11.9 | 0.4 | INVENTIVE STEEL |
| A9 | 20 | 5 | 0.05 | 11.0 | 0.2 | COMPARATIVE STEEL |
| A10 | 19 | 5 | 0.04 | 11.4 | 0.2 | INVENTIVE STEEL |
| A11 | 18 | 5 | 0.05 | 11.7 | 0.4 | COMPARATIVE STEEL |
| A12 | 16 | 5 | 0.05 | 12.2 | 0.4 | COMPARATIVE STEEL |
| A13 | 60 | 3 | 0.03 | 9.8 | 1.2 | COMPARATIVE STEEL |
| A14 | 20 | 4 | 0.05 | 12.0 | 0.4 | INVENTIVE STEEL |
| A15 | 48 | 3 | 0.03 | 10.2 | 0.7 | INVENTIVE STEEL |
| B1 | 19 | 3 | 0.03 | 11.5 | 0.3 | COMPARATIVE STEEL |
| B2 | 20 | 4 | 0.04 | 11.6 | 0.2 | INVENTIVE STEEL |
| B3 | 19 | 6 | 0.04 | 11.6 | 0.2 | INVENTIVE STEEL |
| B4 | 60 | 14 | 0.13 | 10.6 | 1.0 | COMPARATIVE STEEL |
| B6 | 28 | 5 | 0.04 | 11.6 | 0.3 | COMPARATIVE STEEL |
| C1 | 30 | 3 | 0.03 | 11.6 | 0.3 | COMPARATIVE STEEL |
| C2 | 25 | 6 | 0.07 | 11.7 | 0.3 | INVENTIVE STEEL |
| C3 | 30 | 4 | 0.03 | 11.6 | 0.3 | COMPARATIVE STEEL |
| C4 | 28 | 5 | 0.05 | 10.0 | 0.7 | INVENTIVE STEEL |
| C5 | 30 | 4 | 0.04 | 8.9 | 0.7 | COMPARATIVE STEEL |
| C6 | 30 | 3 | 0.04 | 12.1 | 0.3 | COMPARATIVE STEEL |
| C7 | 30 | 4 | 0.04 | 11.8 | 0.3 | INVENTIVE STEEL |
| C8 | 29 | 3 | 0.04 | 11.6 | 0.3 | INVENTIVE STEEL |

TABLE 6-continued

| TREATMENT NUMBER | NUMBER DENSITY OF ASPECT RATIO OF MARTENSITE IN DECARBURIZED LAYER >5 (f_MC) % | f_MC DIFFERENCE IN WIDTH DIRECTION % | DIFFERENCE IN FATIGUE LIMIT RATIO | Fe % | Fe CONCENTRATION DIFFERENCE IN WIDTH DIRECTION % | REMARKS |
|---|---|---|---|---|---|---|
| C9 | 62 | 13 | 0.13 | 10.9 | 1.1 | COMPARATIVE STEEL |
| D1 | UNMEASURABLE | 4 | 0.03 | 11.3 | 0.4 | COMPARATIVE STEEL |
| D2 | 34 | 3 | 0.04 | 11.4 | 0.4 | INVENTIVE STEEL |
| D3 | 33 | 3 | 0.04 | 11.7 | 0.2 | INVENTIVE STEEL |
| D4 | 35 | 6 | 0.06 | 15.3 | 0.1 | COMPARATIVE STEEL |
| D5 | 30 | 6 | 0.05 | 8.5 | 1.6 | COMPARATIVE STEEL |
| D6 | 30 | 4 | 0.03 | 11.2 | 0.4 | INVENTIVE STEEL |
| D7 | 30 | 6 | 0.05 | 11.9 | 0.2 | INVENTIVE STEEL |
| D8 | 35 | 6 | 0.07 | 11.6 | 0.1 | COMPARATIVE STEEL |
| E1 | 35 | 6 | 0.06 | 11.3 | 0.1 | COMPARATIVE STEEL |
| E2 | 37 | 3 | 0.03 | 11.9 | 0.1 | INVENTIVE STEEL |
| E3 | 34 | 5 | 0.05 | 11.6 | 0.4 | INVENTIVE STEEL |
| E4 | 35 | 5 | 0.06 | 11.9 | 0.4 | INVENTIVE STEEL |
| E5 | 35 | 3 | 0.03 | 11.9 | 0.4 | COMPARATIVE STEEL |
| F1 | 10 | 5 | 0.04 | 11.5 | 0.1 | COMPARATIVE STEEL |
| F2 | 26 | 3 | 0.02 | 11.8 | 0.1 | INVENTIVE STEEL |
| F3 | 25 | 6 | 0.05 | 11.4 | 0.4 | INVENTIVE STEEL |
| F4 | 23 | 5 | 0.04 | 11.2 | 0.3 | INVENTIVE STEEL |
| F5 | 29 | 3 | 0.04 | 11.9 | 0.4 | COMPARATIVE STEEL |
| F6 | 26 | 4 | 0.05 | 11.8 | 0.3 | COMPARATIVE STEEL |
| F7 | 47 | 4 | 0.03 | 12.0 | 0.3 | COMPARATIVE STEEL |
| G1 | 31 | 5 | 0.06 | 11.6 | 0.2 | COMPARATIVE STEEL |
| G2 | 26 | 3 | 0.04 | 11.6 | 0.2 | INVENTIVE STEEL |
| G3 | 65 | 13 | 0.12 | 10.8 | 1.2 | COMPARATIVE STEEL |
| G5 | 31 | 3 | 0.04 | 7.5 | 0.7 | COMPARATIVE STEEL |
| G9 | 65 | 13 | 0.12 | 10.8 | 1.0 | COMPARATIVE STEEL |
| H1 | 28 | 4 | 0.05 | 11.1 | 0.1 | INVENTIVE STEEL |
| H2 | 31 | 3 | 0.02 | 11.6 | 0.3 | COMPARATIVE STEEL |
| I1 | 35 | 6 | 0.07 | 12.0 | 0.3 | INVENTIVE STEEL |
| J1 | 24 | 6 | 0.06 | 12.0 | 0.4 | INVENTIVE STEEL |
| K1 | 23 | 3 | 0.02 | 11.2 | 0.3 | INVENTIVE STEEL |
| L1 | 28 | 5 | 0.06 | 11.2 | 0.4 | INVENTIVE STEEL |
| L2 | 27 | 5 | 0.04 | 11.4 | 0.3 | COMPARATIVE STEEL |
| M1 | 28 | 6 | 0.05 | 11.3 | 0.1 | INVENTIVE STEEL |
| N1 | 29 | 4 | 0.03 | 11.2 | 0.4 | INVENTIVE STEEL |
| O1 | 30 | 3 | 0.04 | 11.6 | 0.1 | INVENTIVE STEEL |
| P1 | 21 | 4 | 0.03 | 11.9 | 0.4 | INVENTIVE STEEL |
| Q1 | 31 | 5 | 0.05 | 11.7 | 0.4 | INVENTIVE STEEL |
| R1 | 31 | 5 | 0.05 | 11.3 | 0.2 | INVENTIVE STEEL |
| S1 | 30 | 3 | 0.03 | 11.3 | 0.2 | INVENTIVE STEEL |
| T1 | 32 | 3 | 0.03 | 11.1 | 0.2 | INVENTIVE STEEL |
| a1 | 33 | 6 | 0.06 | 12.0 | 0.2 | COMPARATIVE STEEL |
| b1 | 34 | 5 | 0.06 | 11.2 | 0.4 | COMPARATIVE STEEL |
| c1 | 40 | 6 | 0.05 | 11.0 | 0.2 | COMPARATIVE STEEL |
| d1 | 30 | 5 | 0.06 | 11.4 | 0.2 | COMPARATIVE STEEL |
| e1 | 30 | 3 | 0.04 | 12.0 | 0.2 | COMPARATIVE STEEL |
| f1 | 31 | 6 | 0.07 | 11.8 | 0.1 | COMPARATIVE STEEL |
| g1 | 33 | 5 | 0.04 | 11.5 | 0.2 | COMPARATIVE STEEL |
| h1 | 35 | 5 | 0.04 | 11.2 | 0.2 | COMPARATIVE STEEL |
| i1 | 33 | 3 | 0.02 | 11.0 | 0.2 | COMPARATIVE STEEL |

TABLE 7

| TREATMENT NUMBER | APPEARANCE | PLATING PEELING | FINE-GRAIN LAYER THICKNESS μm | TENSILE STRENGTH N/mm$^2$ | ELONGATION % |
|---|---|---|---|---|---|
| A1 | ⊚ | ○ | 2.7 | 989 | 16.3 |
| A2 | ⊚ | ○ | 2.1 | 980 | 16.5 |
| A3 | ⊚ | ○ | 3.2 | 1112 | 16.7 |
| A4 | ⊚ | ○ | 2.7 | 993 | 16.8 |
| A5 | ⊚ | ○ | 2.5 | 1108 | 16.7 |
| A6 | ⊚ | ○ | 2.7 | 978 | 17.5 |
| A7 | ⊚ | ○ | 2.7 | 1126 | 16.8 |
| A8 | ⊚ | ○ | 2.7 | 1246 | 16.9 |
| A9 | ⊚ | ○ | 2.1 | 1110 | 17.0 |
| A10 | ⊚ | ○ | 3.2 | 1250 | 16.2 |
| A11 | ⊚ | ○ | 2.1 | 1258 | 16.5 |
| A12 | ⊚ | ○ | 4.2 | 979 | 17.0 |

TABLE 7-continued

| | | | | | |
|---|---|---|---|---|---|
| A13 | ○ | X | ≤0.1 | 998 | 16.7 |
| A14 | ◎ | ○ | 4.0 | 982 | 16.9 |
| A15 | ○ | ○ | 0.3 | 995 | 16.7 |
| B1 | ◎ | ○ | 3.2 | 1040 | 9.0 |
| B2 | ◎ | ○ | 2.7 | 1150 | 14.0 |
| B3 | ◎ | ○ | 2.5 | 1190 | 14.0 |
| B4 | ○ | ○ | 2.5 | 1199 | 14.0 |
| B6 | ◎ | ○ | 2.7 | 1182 | 14.1 |
| C1 | ◎ | ○ | 3.4 | 888 | 11.0 |
| C2 | ◎ | ○ | 2.7 | 1138 | 15.0 |
| C3 | ◎ | ○ | 2.3 | 1120 | 15.0 |
| C4 | ◎ | ○ | 0.3 | 1130 | 15.5 |
| C5 | X | X | ≤0.1 | 1150 | 14.1 |
| C6 | ◎ | ○ | 2.7 | 1090 | 15.0 |
| C7 | ◎ | ○ | 2.7 | 1105 | 16.2 |
| C8 | ◎ | ○ | 2.1 | 1111 | 15.8 |
| C9 | ○ | ○ | 2.7 | 1125 | 14.5 |
| D1 | ◎ | ○ | 2.7 | 600 | 10.7 |
| D2 | ◎ | ○ | 2.7 | 1030 | 17.0 |
| D3 | ◎ | ○ | 2.1 | 1065 | 16.5 |
| D4 | X | ○ | 2.5 | 970 | 10.0 |
| D5 | X | ○ | 2.7 | 1,035 | 16.8 |
| D6 | ◎ | ○ | 2.7 | 1,031 | 16.5 |
| D7 | ◎ | ○ | 2.1 | 1,040 | 16.2 |
| D8 | X | ○ | 3.2 | 978 | 10.3 |
| E1 | ◎ | ○ | 2.7 | 820 | 17.0 |
| E2 | ◎ | ○ | 2.9 | 823 | 20.0 |
| E3 | ◎ | ○ | 2.5 | 835 | 22.0 |
| E4 | ◎ | ○ | 2.9 | 842 | 21.8 |
| E5 | ◎ | ○ | 3.4 | 770 | 20.0 |
| F1 | ◎ | ○ | 2.7 | 1345 | 6.2 |
| F2 | ◎ | ○ | 2.3 | 983 | 18.6 |
| F3 | ◎ | ○ | 2.5 | 992 | 18.3 |
| F4 | ◎ | ○ | 2.7 | 1035 | 17.5 |
| F5 | ◎ | ○ | 2.7 | 982 | 17.8 |
| F6 | ◎ | ○ | 2.1 | 980 | 18.0 |
| F7 | ◎ | ○ | 3.2 | 979 | 16.0 |
| G1 | ◎ | ○ | 3.2 | 938 | 18.5 |
| G2 | ◎ | ○ | 2.9 | 942 | 20.5 |
| G3 | ○ | ○ | 2.5 | 952 | 20.1 |
| G5 | X | ○ | 2.9 | 943 | 20.3 |
| G9 | ○ | ○ | 2.9 | 950 | 20.3 |
| H1 | ◎ | ○ | 2.7 | 1280 | 13.0 |
| H2 | X | ○ | 2.5 | 1269 | 13.2 |
| I1 | ◎ | ○ | 2.9 | 1200 | 15.0 |
| J1 | ◎ | ○ | 2.5 | 1230 | 14.2 |
| K1 | ◎ | ○ | 2.9 | 1280 | 13.8 |
| L1 | ◎ | ○ | 2.1 | 983 | 17.0 |
| L2 | ◎ | ○ | 3.2 | 871 | 6.0 |
| M1 | ◎ | ○ | 2.1 | 1084 | 15.5 |
| N1 | ◎ | ○ | 2.1 | 1080 | 16.0 |
| O1 | ◎ | ○ | 3.2 | 1075 | 16.8 |
| P1 | ◎ | ○ | 2.7 | 982 | 19.3 |
| Q1 | ◎ | ○ | 2.5 | 1100 | 15.8 |
| R1 | ◎ | ○ | 2.9 | 990 | 18.0 |
| S1 | ◎ | ○ | 2.7 | 998 | 17.9 |
| T1 | ◎ | ○ | 2.5 | 996 | 18.3 |
| a1 | ◎ | ○ | 2.1 | 1,313 | 8.0 |
| b1 | ◎ | ○ | 3.2 | 1,213 | 11.2 |
| c1 | ◎ | ○ | 2.7 | 950 | 8.8 |
| d1 | ◎ | ○ | 2.5 | 523 | 22.0 |
| e1 | ◎ | ○ | 2.9 | 780 | 15.0 |
| f1 | ◎ | ○ | 3.2 | 1,100 | 9.8 |
| g1 | ◎ | ○ | 2.7 | 983 | 15.0 |
| h1 | ◎ | ○ | 2.5 | 700 | 6.0 |
| i1 | ◎ | ○ | 2.9 | 851 | 10.3 |

| TREATMENT NUMBER | HOLE EXPANSION | TS × EL MPa % | TS × EL × λ MPa %% | FATIGUE LIMIT RATIO | REMARKS |
|---|---|---|---|---|---|
| A1 | 23 | 16,121 | 370,776 | 0.45 | COMPARATIVE STEEL |
| A2 | 33 | 16,170 | 533,610 | 0.46 | INVENTIVE STEEL |
| A3 | 41 | 18,570 | 761,386 | 0.48 | INVENTIVE STEEL |
| A4 | 40 | 16,682 | 667,296 | 0.50 | INVENTIVE STEEL |

TABLE 7-continued

| | | | | | |
|---|---|---|---|---|---|
| A5 | 41 | 18,504 | 758,648 | 0.46 | INVENTIVE STEEL |
| A6 | 42 | 17,115 | 718,830 | 0.36 | COMPARATIVE STEEL |
| A7 | 41 | 18,917 | 775,589 | 0.48 | INVENTIVE STEEL |
| A8 | 43 | 21,057 | 905,468 | 0.47 | INVENTIVE STEEL |
| A9 | 42 | 18,870 | 792,540 | 0.37 | COMPARATIVE STEEL |
| A10 | 43 | 20,250 | 870,750 | 0.46 | INVENTIVE STEEL |
| A11 | 41 | 20,757 | 851,037 | 0.37 | COMPARATIVE STEEL |
| A12 | 37 | 16,643 | 615,791 | 0.37 | COMPARATIVE STEEL |
| A13 | 39 | 16,667 | 649,997 | 0.39 | COMPARATIVE STEEL |
| A14 | 38 | 16,596 | 630,640 | 0.50 | INVENTIVE STEEL |
| A15 | 39 | 16,617 | 648,044 | 0.43 | INVENTIVE STEEL |
| B1 | 19 | 9,360 | 177,840 | 0.47 | COMPARATIVE STEEL |
| B2 | 38 | 16,100 | 611,800 | 0.49 | INVENTIVE STEEL |
| B3 | 40 | 16,660 | 666,400 | 0.52 | INVENTIVE STEEL |
| B4 | 20 | 16,786 | 335,720 | 0.39 | COMPARATIVE STEEL |
| B6 | 36 | 16,666 | 599,983 | 0.36 | COMPARATIVE STEEL |
| C1 | 40 | 9,768 | 350,723 | 0.51 | COMPARATIVE STEEL |
| C2 | 35 | 17,070 | 597,450 | 0.51 | INVENTIVE STEEL |
| C3 | 30 | 16,800 | 403,200 | 0.47 | COMPARATIVE STEEL |
| C4 | 35 | 17,515 | 613,025 | 0.55 | INVENTIVE STEEL |
| C5 | 30 | 16,215 | 486,450 | 0.55 | COMPARATIVE STEEL |
| C6 | 28 | 16,350 | 457,800 | 0.34 | COMPARATIVE STEEL |
| C7 | 30 | 17,901 | 537,030 | 0.42 | INVENTIVE STEEL |
| C8 | 29 | 17,554 | 509,060 | 0.41 | INVENTIVE STEEL |
| C9 | 22 | 16,313 | 358,875 | 0.39 | COMPARATIVE STEEL |
| D1 | 20 | 6,420 | 128,400 | 0.52 | COMPARATIVE STEEL |
| D2 | 38 | 17,510 | 665,380 | 0.46 | INVENTIVE STEEL |
| D3 | 35 | 17,573 | 615,038 | 0.46 | INVENTIVE STEEL |
| D4 | 33 | 9,700 | 320,100 | 0.47 | COMPARATIVE STEEL |
| D5 | 31 | 17,388 | 539,028 | 0.47 | COMPARATIVE STEEL |
| D6 | 30 | 17,012 | 510,345 | 0.47 | INVENTIVE STEEL |
| D7 | 30 | 16,848 | 505,440 | 0.47 | INVENTIVE STEEL |
| D8 | 31 | 10,073 | 312,275 | 0.47 | COMPARATIVE STEEL |
| E1 | 25 | 13,940 | 348,500 | 0.46 | COMPARATIVE STEEL |
| E2 | 30 | 16,460 | 493,800 | 0.46 | INVENTIVE STEEL |
| E3 | 30 | 18,370 | 551,100 | 0.47 | INVENTIVE STEEL |
| E4 | 29 | 18,356 | 532,312 | 0.48 | INVENTIVE STEEL |
| E5 | 25 | 15,400 | 385,000 | 0.47 | COMPARATIVE STEEL |
| F1 | 42 | 8,339 | 350,238 | 0.39 | COMPARATIVE STEEL |
| F2 | 30 | 18,284 | 548,514 | 0.50 | INVENTIVE STEEL |

TABLE 7-continued

| | | | | | |
|---|---|---|---|---|---|
| F3 | 35 | 18,154 | 635,376 | 0.51 | INVENTIVE STEEL |
| F4 | 37 | 18,113 | 670,163 | 0.50 | INVENTIVE STEEL |
| F5 | 37 | 17,480 | 646,745 | 0.36 | COMPARATIVE STEEL |
| F6 | 38 | 17,640 | 670,320 | 0.36 | COMPARATIVE STEEL |
| F7 | 14 | 15,664 | 219,296 | 0.48 | COMPARATIVE STEEL |
| G1 | 20 | 17,353 | 347,060 | 0.53 | COMPARATIVE STEEL |
| G2 | 36 | 19,311 | 695,196 | 0.52 | INVENTIVE STEEL |
| G3 | 20 | 19,135 | 382,704 | 0.35 | COMPARATIVE STEEL |
| G5 | 33 | 19,143 | 631,716 | 0.48 | COMPARATIVE STEEL |
| G9 | 20 | 19,285 | 385,700 | 0.38 | COMPARATIVE STEEL |
| H1 | 35 | 16,640 | 582,400 | 0.46 | INVENTIVE STEEL |
| H2 | 34 | 16,751 | 569,527 | 0.46 | COMPARATIVE STEEL |
| I1 | 31 | 18,000 | 558,000 | 0.47 | INVENTIVE STEEL |
| J1 | 30 | 17466 | 523980 | 0.48 | INVENTIVE STEEL |
| K1 | 29 | 17664 | 512256 | 0.50 | INVENTIVE STEEL |
| L1 | 34 | 16711 | 568174 | 0.46 | INVENTIVE STEEL |
| L2 | 12 | 5228 | 62734 | 0.55 | COMPARATIVE STEEL |
| M1 | 31 | 16802 | 520862 | 0.48 | INVENTIVE STEEL |
| N1 | 29 | 17280 | 501120 | 0.48 | INVENTIVE STEEL |
| O1 | 32 | 18060 | 577920 | 0.46 | INVENTIVE STEEL |
| P1 | 36 | 18953 | 682294 | 0.47 | INVENTIVE STEEL |
| Q1 | 30 | 17380 | 521400 | 0.48 | INVENTIVE STEEL |
| R1 | 33 | 17820 | 588060 | 0.47 | INVENTIVE STEEL |
| S1 | 32 | 17864 | 571654 | 0.48 | INVENTIVE STEEL |
| T1 | 33 | 18227 | 601484 | 0.46 | INVENTIVE STEEL |
| a1 | 5 | 10,504 | 52,520 | 0.45 | COMPARATIVE STEEL |
| b1 | 7 | 13,586 | 95,099 | 0.46 | COMPARATIVE STEEL |
| c1 | 7 | 8,360 | 58,520 | 0.55 | COMPARATIVE STEEL |
| d1 | 72 | 11,506 | 828,432 | 0.60 | COMPARATIVE STEEL |
| e1 | 30 | 11,700 | 351,000 | 0.54 | COMPARATIVE STEEL |
| f1 | 11 | 10,780 | 118,580 | 0.60 | COMPARATIVE STEEL |
| g1 | 29 | 14,745 | 427,605 | 0.43 | COMPARATIVE STEEL |
| h1 | 2 | 4,200 | 8,400 | 0.22 | COMPARATIVE STEEL |
| i1 | 8 | 8,767 | 70,134 | 0.23 | COMPARATIVE STEEL |

In the examples, in order to clarify the quality of the steel type, the cases where TS×EL≥16000 MP %, TS×EL×λ≥480000 MP %%, fatigue limit ratio≥0.40, fatigue limit ratio difference ≤0.10 were listed as inventive steels.

In the steel sheets of Treatment Numbers A1 and F7, due to the low rolling ratio, the "ratio of ferrite agglomerates each having a thickness of 20 μm or less" was low, resulting in low TS×EL×λ. In the steel sheet of Treatment Number A6, due to the high coiling temperature, the ferrite grain size in the decarburized layer was large, resulting in a low fatigue limit ratio. In the steel sheet of Treatment Number A9, due to the large bending radius of the bending, the ferrite grain size in the decarburized layer was large, resulting in a low fatigue limit ratio.

In the steel sheets of Treatment Numbers A11 and B6, since no bending was performed, the ferrite grain size in the decarburized layer was large, resulting in a low fatigue limit ratio. In Treatment Number A12, due to the high $\log(P_{H2O}/P_{H2})$ of the furnace atmosphere in the preheating zone, the thickness of the decarburized layer increased, resulting in a low fatigue limit ratio. In Treatment Number A13, due to the low $\log(P_{H2O}/P_{H2})$ of the furnace atmosphere in the preheating zone, unevenness occurred on the surface, and the plating adhesiveness deteriorated. Further, since the percentage of martensite grains each having an aspect ratio of 5 or more exceeded 50% in the decarburized layer, the fatigue limit ratio decreased.

In the steel sheet of Treatment Number B1, due to the low cooling rate, the perlite fraction was high, resulting in low TS×EL and low TS×EL×λ. In the steel sheet of Treatment Number C1, due to the short holding time in heating, the structural fraction was not within the range of the present invention, resulting in low TS×EL and low TS×EL×λ.

In the steel sheet of Treatment Number C3, due to the long holding time in heating, TS×EL×λ decreased. In the steel sheet of Treatment Number C5, due to the low $\log(P_{H2O}/P_{H2})$ of the furnace atmosphere in the soaking zone, the thickness of the decarburized layer became less than 10 μm, resulting in deteriorated plating appearance and plating adhesiveness. In the steel sheet of Treatment Number C6, due to the high $\log(P_{H2O}/P_{H2})$ of the furnace atmosphere in the soaking zone, the thickness of the decarburized layer increased, resulting in low TS×EL×λ and low fatigue limit ratio.

In the steel sheet of Treatment Number D1, due to the low maximum attained temperature, the structural fraction was not within the range of the present invention, resulting in low TS×EL and low TS×EL×λ. In the steel sheet of Treatment Number D4, due to the high galvannealing treatment temperature, the plating appearance deteriorated, and due to the large amount of perlite, TS×EL and TS×EL×λ decreased. In the steel sheet of Treatment Number D5, due to the short galvannealing treatment time, resulting in deteriorated plating appearance.

In the steel sheet of Treatment Number D8, due to the long galvannealing treatment time, the plating appearance deteriorated. Further, due to the large amount of perlite, TS×EL and TS×EL×λ decreased. In the steel sheets of Treatment Numbers G1 and E1, due to the low heating rate, the "ratio of ferrite agglomerates each having a thickness of 20 μm or less" was low, resulting in low TS×EL×λ.

In the steel sheet of Treatment Number E5, due to the low cooling stop temperature, the bainite transformation excessively proceeded, and the martensite fraction decreased, resulting in low TS×EL and low TS×EL×λ. In the steel sheet of Treatment Number F1, due to the high maximum attained temperature, the ferrite fraction decreased, resulting in low TS×EL and low TS×EL×λ. In the steel sheet of Treatment Number F5, due to the high coiling temperature, the ferrite grain size in the decarburized layer increased, resulting in a low fatigue limit ratio.

In the steel sheet of Treatment Number F6, due to the large bending radius of bending, the ferrite grain size in the decarburized layer increased, resulting in a low fatigue limit ratio. In the steel sheets of Treatment Numbers G5 and H2, due to the low galvanizing bath temperature, the plating appearance deteriorated, but the extensibility, the hole expandability, and the fatigue property were excellent, and the characteristics in the width direction of the steel sheet was uniformed. In the steel sheet of Treatment Number L2, due to the low heating temperature, the martensite fraction was out of the range of the present invention, resulting in low TS×EL and low TS×EL×λ.

In each of the steel sheets of Treatment Numbers B4, C9, G3, G9, the leveler was not applied before and/or after the acid pickling. Therefore, the number of ferrite agglomerates each having a thickness in the sheet thickness direction of 20 μm or less was less than 50% of the total number of ferrite agglomerates, and the percentage of martensite grains each having an aspect ratio of 5 or more was more than 50% in the decarburized layer. As a result, in each of the steels, the difference in the percentage of martensite grains each having an aspect ratio of 5 or more in the width direction was more than 10%, and the difference in structure in the width direction in the decarburized layer became large, resulting in a large difference in fatigue limit ratio. Further, TS×EL×λ was low, and the fatigue limit ratio was low.

In the steel sheets of Treatment Numbers a1, b1, c1, d1, e1, f1, g1, h1 and i1, since the component compositions were out of the range of the present invention, TS×EL, TS×EL×λ and so on are low. Regarding the other conditions, they are structures within the range of the present invention, so that the surface quality (appearance, plating adhesiveness), TS×EL, TS×EL×λ, the fatigue limit ratio, and the difference in fatigue limit ratio are excellent.

INDUSTRIAL APPLICABILITY

As explained above, according to the present invention, it is possible to provide a high-strength galvannealed steel sheet excellent in extensibility, hole expandability, and fatigue property, and uniformized in characteristics in a width direction of the steel sheet. Accordingly, the present invention is high in availability in a steel producing industry, an automobile manufacturing industry, and other machine manufacturing industries.

The invention claimed is:
1. A galvannealed steel sheet comprising a galvannealed layer on a surface of the steel sheet,
   the steel sheet having a component composition comprising: in mass %,
   C: 0.06% or more and 0.22% or less;
   Si: 0.50% or more and 2.00% or less;
   Mn: 1.50% or more and 2.80% or less;
   Al: 0.01% or more and 1.00% or less;
   P: 0.001% or more and 0.100% or less;
   S: 0.0005% or more and 0.0100% or less;
   N: 0.0005% or more and 0.0100% or less;
   Ti: 0% or more and 0.10% or less;
   Mo: 0% or more and 0.30% or less;
   Nb: 0% or more and 0.050% or less;
   Cr: 0% or more and 1.00% or less;
   B: 0% or more and 0.0050% or less;
   V: 0% or more and 0.300% or less;
   Ni: 0% or more and 2.00% or less;
   Cu: 0% or more and 2.00% or less;
   W: 0% or more and 2.00% or less;
   Ca: 0% or more and 0.0100% or less;
   Ce: 0% or more and 0.0100% or less;
   Mg: 0% or more and 0.0100% or less;
   Zr: 0% or more and 0.0100% or less;
   La: 0% or more and 0.0100% or less;
   REM: 0% or more and 0.0100% or less;
   Sn: 0% or more and 1.000% or less;
   Sb: 0% or more and 0.200% or less; and
   a balance: Fe and impurities, wherein:
   a microstructure of the steel sheet in a range of a ⅛ sheet thickness to a ⅜ sheet thickness centering on a ¼ sheet thickness in a sheet thickness direction from the surface of the steel sheet comprises, in area ratio, ferrite: 15% or more and 85% or less, retained austenite: less than 5%, martensite: 15% or more and 75% or less, perlite: 5% or less, and a balance (including 0%): bainite;

in a range of a ⅛ sheet thickness to a ⅜ sheet thickness centering on a ¼ sheet thickness in a sheet thickness direction from the surface of the steel sheet, a number of ferrite agglomerates in said range having a thickness in the sheet thickness direction of 20 μm or less is 50% or more of a total number of ferrite agglomerates in said range;

a decarburized layer having a thickness of 10 μm or more and 150 μm or less is formed in a surface layer part of the steel sheet;

a grain size of ferrite in the decarburized layer is 30 μm or less; and a number density of martensite grains in the decarburized layer having an aspect ratio of 5 or more among martensite grains in the decarburized layer is 50% or less.

2. The galvannealed steel sheet according to claim 1, wherein the component composition comprises one or two or more of: in mass %,
Ti: 0.01% or more and 0.10% or less;
Mo: 0.01% or more and 0.30% or less;
Nb: 0.005% or more and 0.050% or less;
Cr: 0.01% or more and 1.00% or less;
B: 0.0002% or more and 0.0050% or less;
V: 0.001% or more and 0.300% or less;
Ni: 0.01% or more and 2.00% or less;
Cu: 0.01% or more and 2.00% or less;
W: 0.01% or more and 2.00% or less;
Ca: 0.0001% or more and 0.0100% or less;
Ce: 0.0001% or more and 0.0100% or less;
Mg: 0.0001% or more and 0.0100% or less;
Zr: 0.0001% or more and 0.0100% or less;
La: 0.0001% or more and 0.0100% or less;
REM: 0.0001% or more and 0.0100% or less;
Sn: 0.001% or more and 1.000% or less; and
Sb: 0.001% or more and 0.200% or less.

3. The galvannealed steel sheet according to claim 1, further comprising a fine-grain layer having an average thickness of 0.1 μm to 5.0 μm between the galvannealed layer and the decarburized layer.

4. The galvannealed steel sheet according to claim 3, wherein the component composition comprises one or two or more of: in mass %,
Ti: 0.01% or more and 0.10% or less;
Mo: 0.01% or more and 0.30% or less;
Nb: 0.005% or more and 0.050% or less;
Cr: 0.01% or more and 1.00% or less;
B: 0.0002% or more and 0.0050% or less;
V: 0.001% or more and 0.300% or less;
Ni: 0.01% or more and 2.00% or less;
Cu: 0.01% or more and 2.00% or less;
W: 0.01% or more and 2.00% or less;
Ca: 0.0001% or more and 0.0100% or less;
Ce: 0.0001% or more and 0.0100% or less;
Mg: 0.0001% or more and 0.0100% or less;
Zr: 0.0001% or more and 0.0100% or less;
La: 0.0001% or more and 0.0100% or less;
REM: 0.0001% or more and 0.0100% or less;
Sn: 0.001% or more and 1.000% or less; and
Sb: 0.001% or more and 0.200% or less.

5. The galvannealed steel sheet according to claim 3, wherein a difference in Fe concentration in mass % in a width direction in the galvannealed layer is less than 1.0%, and a difference in the number density of martensite grains each having an aspect ratio of 5 or more in the width direction is 10% or less.

6. The galvannealed steel sheet according to claim 5, wherein the component composition comprises one or two or more of: in mass %,
Ti: 0.01% or more and 0.10% or less;
Mo: 0.01% or more and 0.30% or less;
Nb: 0.005% or more and 0.050% or less;
Cr: 0.01% or more and 1.00% or less;
B: 0.0002% or more and 0.0050% or less;
V: 0.001% or more and 0.300% or less;
Ni: 0.01% or more and 2.00% or less;
Cu: 0.01% or more and 2.00% or less;
W: 0.01% or more and 2.00% or less;
Ca: 0.0001% or more and 0.0100% or less;
Ce: 0.0001% or more and 0.0100% or less;
Mg: 0.0001% or more and 0.0100% or less;
Zr: 0.0001% or more and 0.0100% or less;
La: 0.0001% or more and 0.0100% or less;
REM: 0.0001% or more and 0.0100% or less;
Sn: 0.001% or more and 1.000% or less; and
Sb: 0.001% or more and 0.200% or less.

7. The galvannealed steel sheet according to claim 1, wherein a difference in Fe concentration in mass % in a width direction in the galvannealed layer is less than 1.0%, and a difference in the number density of martensite grains each having an aspect ratio of 5 or more in the width direction is 10% or less.

8. The galvannealed steel sheet according to claim 7, wherein the component composition comprises one or two or more of: in mass %,
Ti: 0.01% or more and 0.10% or less;
Mo: 0.01% or more and 0.30% or less;
Nb: 0.005% or more and 0.050% or less;
Cr: 0.01% or more and 1.00% or less;
B: 0.0002% or more and 0.0050% or less;
V: 0.001% or more and 0.300% or less;
Ni: 0.01% or more and 2.00% or less;
Cu: 0.01% or more and 2.00% or less;
W: 0.01% or more and 2.00% or less;
Ca: 0.0001% or more and 0.0100% or less;
Ce: 0.0001% or more and 0.0100% or less;
Mg: 0.0001% or more and 0.0100% or less;
Zr: 0.0001% or more and 0.0100% or less;
La: 0.0001% or more and 0.0100% or less;
REM: 0.0001% or more and 0.0100% or less;
Sn: 0.001% or more and 1.000% or less; and
Sb: 0.001% or more and 0.200% or less.

* * * * *